United States Patent [19]

Shiraki et al.

[11] Patent Number: 4,733,119
[45] Date of Patent: Mar. 22, 1988

[54] 1-PHASE SELF-STARTING DISK-TYPE BRUSHLESS MOTOR WITH COGGING-PRODUCING ELEMENT

[75] Inventors: Manabu Shiraki; Osami Miyao, both of Kanagawa, Japan

[73] Assignee: Shicoh Engineering Co., Ltd., Kanagawa, Japan

[21] Appl. No.: 909,719

[22] Filed: Sep. 22, 1986

[51] Int. Cl.[4] .............................. H02K 21/14
[52] U.S. Cl. .................. 310/268; 310/68 R; 310/193; 310/254
[58] Field of Search ............ 310/68 R, 254, 268; 310/67 R, 193

[56] References Cited

U.S. PATENT DOCUMENTS 3,840,761 10/1974 Muller .............................. 310/156
4,620,139 10/1986 Egami et al. ...................... 310/62

Primary Examiner—Patrick R. Salce
Assistant Examiner—D. L. Rebsch
Attorney, Agent, or Firm—Wegner & Bretschneider

[57] ABSTRACT

A 1-phase coreless disk-type brushless motor or axial-flow brushless fan motor comprises a single position-detecting element located at a position on a printed circuit board corresponding to one of the magnetically active conductor portions of a stator coil or coils of the stator armature. A cogging-generating stator yoke having a cutaway portion of a specifically determined angular width is positioned relative to the stator coils, such that an end of the cutaway portion thereof is spaced by a distance equal to about one fourth of the pole width from another magnetically active conductor portion of the stator coils, so that the magnet rotor may stop at a position from which the motor can start itself. Various forms of such cogging generating stator yoke are disclosed, including a stator yoke which also serves as a circuit board.

24 Claims, 34 Drawing Figures

1-PHASE SELF-STARTING DISK-TYPE BRUSHLESS MOTOR WITH COGGING-PRODUCING ELEMENT

BACKGROUND OF THE INVENTION

1. Field of the Invention

This invention relates to a 1-phase energized disk-type brushless motor having a single position detecting element, and more particularly to a 1-phase energized disk-type axial-flow brushless fan motor having a single position detecting element.

2. Description of the Prior Art

As various systems have been developed, brushless motors, especially disk-type brushless motors, suitable for use with such systems, have been required. Disk-type brushless motors can be used as axial-flow brushless fan motors which are widely used in office machines and the like, and in some applications, are required to be very inexpensive, small and very thin, not to mention the rotational efficiency (naturally, the rotational efficiency must be higher than a particular lever in order that they may be of practical use as such).

Those motors which meet the requirements best are 1-phase energized disk-type brushless motors which include a single armature coil and a single position detecting element. In such 1-phase energized disk-type brushless fan motors, a field magnet is used as a rotor and is disposed for relative rotation in a face-to-face opposing relationship to a stator armature having one or more armature coils thereon. However, such a mere 1-phase energized disk-type brushless motor cannot actually operate as a motor because it cannot rotate continuously, although the magnet rotor can turn over a predetermined range. Otherwise, even if a motor having a single armature coil and a single position-detecting element can rotate continuously, the single armature coil could not provide a sufficiently strong turning force. Therefore, for a sufficient turning force, two or more armature coils must necessarily be provided for a motor.

A disk-type brushless motor having two armature coils for a stator armature normally requires two or more position-detecting elements. In most cases, magnetoelectric transducers such as Hall elements or Hall ICs (integrated circuits) are used for the position-detecting elements. However, since such position-detecting elements are expensive, it is desirable for a motor to include, if possible, only one position-detecting element in order that inexpensive, small disk-type brushless motors can be mass produced. However, such a motor having a single position-detecting element has a drawback that, where armature coils are arranged at same-phase positions for a single phase, it cannot start itself if the position-detecting element detects a boundary between the N (north) pole and the S (south) pole of the magnet rotor, that is, a dead point, and similarly in a motor having a single coil as described above.

Where a motor has armature coils arranged for two phases, it requires two position-detecting elements and therefore driver circuits for the two phases, resulting in increased cost.

Thus, in order for a motor to contain a single position detecting element, it must be a 1-phase energized brushless motor.

Further, a 1-phase energized brushless motor is very advantageous where it is used particularly as an axial-flow brushless fan motor. Accordingly, it is desirable for a motor to contain only one position-detecting element which is very expensive and only one driver circuit for a single phase.

Accordingly, in a 1-phase energized brushless motor, in order that the motor may be produced at a low cost and rotated continuously with only one position-detecting element contained therein, it is designed such that the rotor may be positioned, upon stopping and starting, normally at a position other than a dead point so as to utilize a cogging torque to assure self-starting of the motor. More particularly, a 1-phase or single phase motor has a dead point at an energization switching point at which the motor provides zero or no torque. Therefore, the 1-phase motor has a drawback that it cannot start itself if the rotor position upon starting of the motor is just at a dead point.

Therefore, a 1-phase motor is normally provided with a cogging generating magnetic member (an iron piece is used therefor) for generating a torque (cogging torque) in addition to a torque generated by an armature coil and a field magnet (rotor magnet) in order to eliminate such dead points to allow self-starting of the motor.

In a coreless brushless motor, for example, the following methods for generating a cogging torque are known. Referring first to FIG. 1, a 6-pole field magnet or magnet rotor 2 having an alternate arrangement of the 6 north and south poles is mounted on a rotor yoke 1 in an opposing relationship to a stator yoke 5 with an air gap 4 left therebetween and with a pair of coreless armature coils 3 disposed in the air gap 4. In the motor of FIG. 1, the stator yoke 5 has at a face thereof opposing the field magnet 2 two inclined surfaces which thus define the complementarily inclined air gap 4. This method, however, has a drawback that the efficiency is relatively low because the air gap is relatively great. Besides, it is troublesome to form such inclined surfaces on a face of a stator yoke.

Referring now to FIG. 2, another method is illustrated. In the motor of FIG. 2, a stator yoke 5 has no such inclined faces as provided on the stator yoke 5 of FIG. 1. Instead, an iron bar 6 is mounted on the stator yoke 5 and extends through each of a pair of coreless armature coils 3 disposed in a uniform air gap 4 defined by the stator yoke 5 and a field magnet or magnet rotor 2 on a rotor yoke 1. According to this arrangement, a magnetic flux will appear as seen in FIG. 3, and hence the field magnet 2 will stop at a position in which the iron bars 6 are each opposed to the center of one of the N and S poles of the field magnet 2. Accordingly, if the armature coils 3 are located so as to produce a rotational torque in such a stopping position of the field magnet 2, a coreless brushless motor which can start itself will be obtained.

However, the method as shown in FIG. 2 has a drawback that if the thickness of the iron bars 6 is increased in order to increase the cogging torque, to assure that the motor can be started more certainly by itself, a phenomenon that the torque around dead points decreases will appear because a magnetic flux 7 will act as shown in FIG. 4 around the dead points.

In order to obtain an ideal torque—angular rotor displacement curve, it is necessary to obtain a composite torque curve 8 as shown in FIG. 5. In FIG. 5, an armature coil torque curve by an armature coil is indicated by a curve 9 while a cogging torque curve by a cogging generating magnetic member is indicated by a curve 10. As apparent from the armature coil torque curve 9 and the cogging torque curve 10, the cogging torque should be a half of the armature torque in magnitude. Accordingly, the torque curve 8 composite of the armature coil torque and the cogging torque exhibits a substantially uniform rotational torque over the entire range of rotation.

In order to obtain such an ideal composite torque curve 8, a cogging magnetic member must be designed correctly in size and location, and the present invention can provide such an ideal composite torque curve 8.

Thus, the present applicant already proposed and applied for a patent a disk-type brushless motor wherein a cogging torque having a sufficient magnitude and presenting an ideal torque-angular rotor displacement curve can be produced. Now, the disk-type brushless motor of the preceding patent application will be described with reference to FIGS. 6 to 10.

FIG. 6 is a plan view of a 1-phase energized disk-type axial-flow brushless fan motor to which a 1-phase energized disk-type brushless motor is applied, FIG. 7 a vertical sectional view of the motor of FIG. 6, FIG. 8 a bottom plan view of a 6-pole field magnet, FIG. 9 an enlarged vertical sectional view of the stator side of the motor of FIG. 7, and FIG. 10 is a plan view of a stator armature of the motor of FIG. 7.

A disk-type axial-flow brushless fan motor 11 includes a casing 12 made of a plastics material and having a rectangular shape in plan (FIG. 6) and a cup-shaped vertical section (FIG. 7) with an inner spacing 13 formed therein in which a motor device 14 which will be hereinafter described is located. A plurality of stays not shown are formed at the bottom of the spacing 13 and define therebetween inlet windows 16 for passing therethrough a wind caused by a fan blade 15 which will be hereinafter described.

The disk-type axial-flow brushless fan motor 11 further includes a rotor 17 having a plurality of fan blades 15 integrally formed around an outer periphery of a cup-shaped body 18 made of plastic material. The cup-shaped body 18 has a rotor yoke 19 securely mounted on an inner face thereof, and a 6-pole field magnet or magnet rotor 2 is securedly mounted on a lower face of the rotor yoke 19 and has 6 alternate N and S magnet poles magnetized with an equal magnetization angular width as shown in FIG. 8. A rotary shaft 20 is secured at an end thereof to the rotor 17 and supported for rotation adjacent the other end thereof by means of an oilless metal bearing 21.

A printed circut board 22 is supported on the casing 12, and a stator yoke 23 is located on the printed circuit board 22. The stator yoke 23 has securely mounted thereon by a suitable means a cogging generating magnetic member 25 which will be hereinafter described. The stator yoke 23 is provided for closing a magnetic path of the field magnet 2. The stator yoke 23 is processed for insulation on a surface thereof and includes a pair of coreless-type armature coils 29-1, 29-2 fixedly mounted thereon and arranged in a symmetrical relationship relative to the center of the motor 11, that is, in a spaced relationship by an angle of 180 degrees around the center of the motor 11, as shown in FIG. 10. The armature coils 29-1, 29-2 are approximately sector-shaped in plan and each have a pair of radial, magnetically active conductor portions 29a, 29b which contribute to generation of a torque and include therebetween a distance or angular width substantially equal to the angular width of each magnetic pole of the field magnet 2. In particular, because the field magnet 2 has 6 poles and hence the width of each pole thereof is 60 degrees, the width between the magnetically active conductor portions 29a, 29b is 60 degrees. Each of the armature coils 29-1, 29-2 further has a pair of circumferential conductor portions 29c, 29d which do not contribute to generation of a torque.

A position-detecting element 24 composed of a magnetoelectric transducer such as Hall element, a Hall IC (integrated circuit) or a magnetic reluctance element is located at a position circumferentially displaced by an angle substantially equal to the width of each pole of the field magnet 2, that is, by an angle of 60 degrees, from the magnetically active conductor portion 29b of the armature coil 29-1. Accordingly, the position detecting element 24 is arranged at a position intermediate the magnetically active conductor portion 29b of the armature coil 29-1 and the magnetically active conductor portion 29a of the armature coil 29-2.

The cogging generating magnetic member 25 is securely mounted on an upper face of the stator yoke 23 and is in the form of a plate having an angular width substantially equal to the angular width of each pole of the field magnet 2, that is, an angular width of 60 degrees. The cogging generating magnetic member 25 is located on the stator yoke 23 such that the radial center line 27 between the width thereof is at a position spaced by about three fourths of the width of each pole of the field magnet 2, that is, by an angle of 45 degrees, from the magnetically active conductor portion 29b of the armature coil 29-2.

Since the disk-type axial-flow brushless fan motor 11 has such a construction as described above, the field magnet 2 which is mounted for relative rotation in a face-to-face opposing relationship to the armature coils 29-1, 29-2, the position detecting element 24 and the cogging generating magnetic member 29 will stop, upon stopping of the motor 11, at a position wherein the cogging generating magnetic member 25 is attracted by one of the N and S poles of the field motor 2 to enable self-starting of the motor 11. Accordingly, if the power source is thrown in again, since the position detecting element 24 detects an N or S pole of the field magnet 2, the armature coils 29-1, 29-2 are energized in a predetermined direction in response to a signal from the position detecting element 24 to thus generate an armature coil torque in a predetermined direction. Consequently, the rotor 17 having the field magnet 2 thereon is driven to rotate to cause the blades 15 thereon to send a wind through the inlet openings 16. In this manner, a cogging torque is generated due to the presence of the cogging generating magnetic member 25 and causes the rotor 17 to a position other than dead points. Accordingly, an N or S pole of the field magnet 2 will soon be detected by the position-detecting element 24, and hence the rotor 17 can thereafter rotate continuously. Besides, because the cogging generating magnetic member 25 having such a shape as described above is located at such a position as described above, an ideal cogging torque will be generated at an ideal rotational angular position, and hence a rotational torque will be obtained which is substantially uniform over an entire range of rotational angle.

It is to be noted that while the motor described above contains two armature coils, it may otherwise contain one or three or more armature coils therein.

As apparent from the foregoing description, such a coreless, 1-phase energized disk-type brushless motor as described above is very useful in practical use because it can start itself with a single position detecting element, a cogging torque of a sufficient magnitude can be produced, and a rotational torque can be produced which is uniform over an entire range of rotational angle to allow smooth rotation of the motor.

However, according to the disk-type axial-flow brushless fan motor 11 to which such a 1-phase energized brushless fan motor as described above is applied, the cogging generating magnetic member 25 must be secured to the stator yoke 23 after the former has been positioned properly on the latter. Further, there is a drawback which is troublesome and deteriorates the mass-productivity, that although a chip part which is an electric circuitry part constituting an energization controlling circuit must necessarily be located on the printed circuit board 22 having a printed wiring pattern not shown thereon and located at the lower face of the stator yoke 23, the stator yoke 23 must have a cutaway portion 28 and a terminal 16 of the position detecting element 24 on the stator yoke 22 must extend through the cutaway portion 28 of the stator yoke 23 and be connected to a predetermined portion of the printed circuit board 23. It is to be noted here that the position-detecting element 24 does not achieve its function unless it is located in a face-to-face relationship to the field magnet 2. Accordingly, the position-detecting element 24 cannot be located on a lower face of the stator yoke 22.

SUMMARY OF THE INVENTION

It is an object of the present invention to provide a 1-phase energized coreless disk-type brushless motor which can provide a cogging torque showing an ideal torque-angular rotor displacement curve having a sufficient magnitude to allow self-starting of the motor.

It is another object of the invention to provide a 1-phase energized coreless disk-type brushless motor which can start itself and wherein the rotor can be rotated very smoothly with reduced rotational noises.

It is a further object of the invention to provide a 1-phase energized coreless disk-type brushless motor which has a built-in energization controlling circuit for controlling the motor.

In order to attain the objects, according to the present invention, there is provided a 1-phase energized brushless motor, comprising: a magnet rotor mounted for rotation and having 2P (P is an integer equal to or greater than 1) north and south poles; at least one coreless armature coil disposed at a stationary same phase position in an opposing relationship to said magnet rotor with an air gap left therebetween; a stator yoke for mounting said armature coil thereon; a single position-detecting element for determining in which direction electric current flows through said armature coil; and an electric circuit for detecting a pole of said magnet rotor to selectively energize said armature coil; said stator yoke having formed therein at least one cutaway portion defined by an arc of the stator yoke and two ends, each of which extends in a radial direction of the stator yoke or a direction oblique to the radial direction, and between said ends, having an angular width $\theta$ determined by the following expression:

$$T \leq m \cdot T \leq \theta < 2n \cdot T$$

where T is the angular width of each pole of said magnet rotor, m is an integer ranging from 1 to 2n, and n is an integer of at least 1 with 2n being equal to or smaller than the total number 2P of poles of said magnet rotor; said stator yoke being located such that at least one of said ends of said cutaway portion thereof is positioned within a range from a position at which a maximum starting torque can be obtained or any other same-phase position to a position spaced backwardly therefrom by a distance equal to about one half of the angular width of each pole of said magnet rotor in the direction of rotation of said magnet rotor.

DESCRIPTION OF THE PREFERRED EMBODIMENTS

Now, a disk-type brushless motor according to a first embodiment of the invention which is applied to a disk-type axial-flow brushless fan motor will be described with reference to FIGS. 11 to 16. The motor shown is constructed as a 1-phase disk-type axial-flow brushless fan motor having a single position-detecting element, two coils and a magnet rotor or field magnet having 4 poles, but otherwise if the motor has only one coil, it can be driven on a similar principle.

Figure 11:
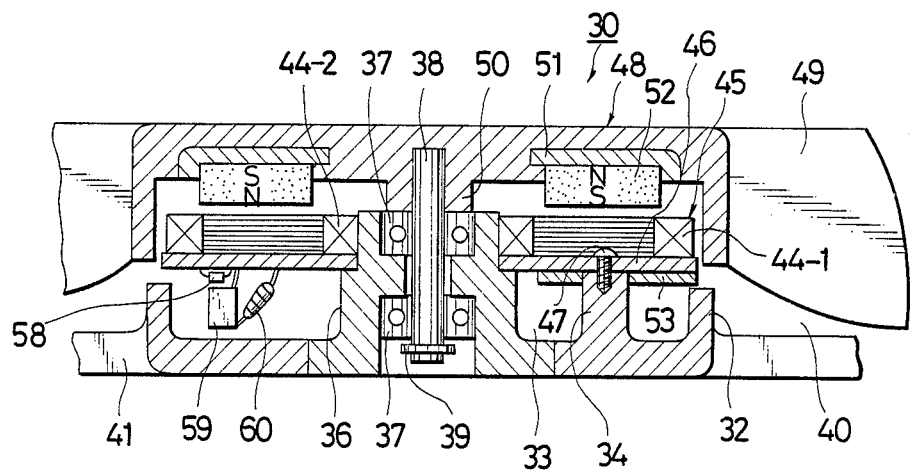
FIG. 11 is a vertical sectional view of a disk-type axial-flow brushless fan motor according to a first embodiment of the invention.
Figure 12:
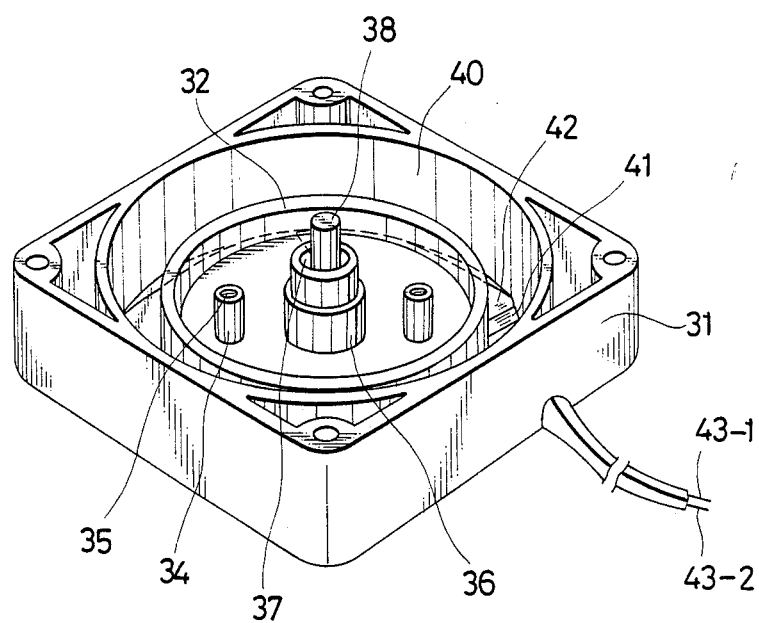
FIG. 12 is a perspective view, in a somewhat reduced scale, of a case of the fan motor of FIG. 11.

Referring first to FIGS. 11 and 12, the disk-type brushless fan motor generally designated at 30 includes an angular case 31 which is made of, for example, plastic material and generally flattened in its axial direction. The case 31 has at a central portion thereof an integral, generally cup-shaped motor casing 32 defining therein a recessed spacing 33. The recessed spacing 33 of the motor casing 32 can accommodate therein electric parts of an energization controlling circuit as hereinafter described, which allows high performance disk-type brushless motors or disk-type axial-flow brushless fan motors to be produced with simplified mass-production steps and at a reduced cost.

A pair of posts 34 are formed integrally on, and extend uprightly from, the bottom of the casing 32, each part having a threaded hole 35 formed at the top thereof. A bearing housing or hub 36 is formed at the center of, and also extends uprightly from, the bottom of the casing 32, and a pair of journal bearings 37 are located in a pair of openings at the upper and lower ends of the bearing housing 36. A rotary shaft 38 extends through a center bore of the bearing housing 36 and is supported for rotation substantially at the center of the disk-type axial-flow brushless fan motor 30 by means of the journal bearings 37. An E-snap ring 39 is mounted adjacent the bottom end of the rotary shaft 38 so that the shaft 38 may not be pulled off upwardly.

A spacing 40 is formed between the case 31 and the casing 32, and the case 31 and the casing 32 are interconnected by means of stays 41 with air inlet windows 42 left therebetween. A positive power cord 43-1 and a negative power cord 43-2 extend from the case 31 for electric connection with an external power supply.

A stator armature 45 is composed of a pair of armature coils 44-1, 44-2 mounted on an upper face of a printed circuit board 46 and is securely mounted at the top of the posts 34 by means of screws 47 made of a nonmagnetic material and screwed into the threaded holes 35 at the top of the posts 34 by way of perforations formed in the printed circuit board 46. The armature coils 44-1, 44-2 are located in a symmetrical relationship relative to the center of the printed circuit board 46 and hence of the motor 30, or in other words, in an angularly displaced relationship by 180 degrees around the center of the motor 30, as seen in FIG. 14.

Figure 13:
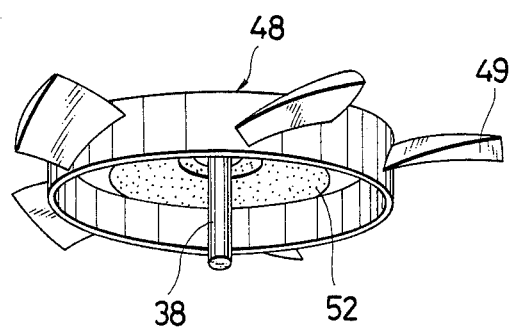
FIG. 13 is a perspective view of a cup member with fan blades of FIG. 11.
Figure 15:
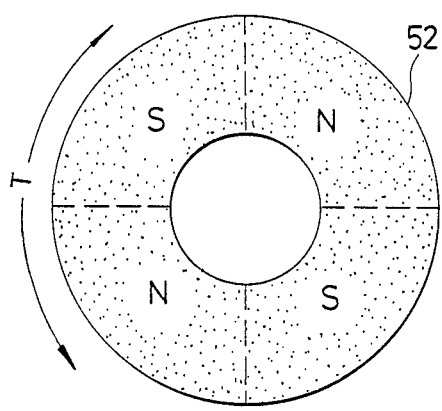
FIG. 15 is a plan view of a 4-pole annular magnet rotor.

Above the stator armature 45, a cup member 48 is mounted for rotation in a parallel opposing relationship. The cup member 48 is made of plastic material and is generally flattened in an axial direction thereof as seen in FIG. 13, and has several fan blades 49 integrally formed on an outer periphery thereof. A hub 50 is integrally formed substantially at the center of an inner or lower face of the cup member 48, and the rotary shaft 38 is securely fitted in the hub 50 of the cup member 48 for integral rotation with the latter. An annular rotor yoke 51 is securely mounted on the inner face of the cup member 48. An annular 4-pole field magnet or magnet rotor 52 having four alternate N and S magnet poles as shown in FIG. 15 is securely mounted on a lower face of the rotor yoke 51 in an opposing relationship to the stator armature 45.

Figure 14:
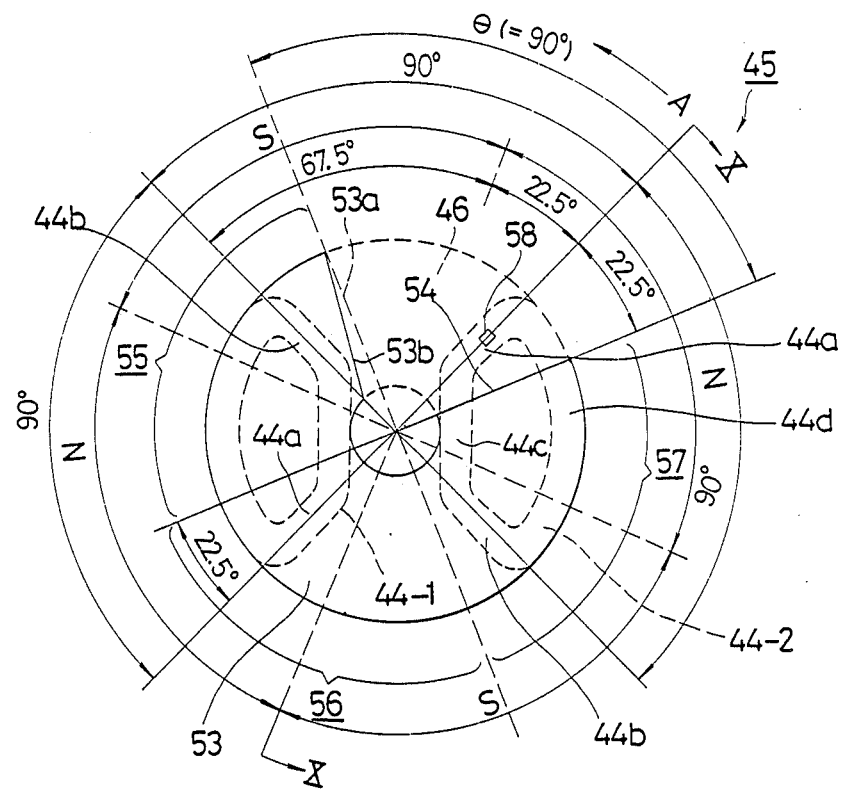
FIG. 14 is a bottom plan view of a stator armature including two armature coils and a cogging generating element where a 4-pole magnet rotor is employed in the motor of FIG. 11 according to the first embodiment of the invention.

The two armature coils 44-1, 44-2 are located at spaced symmetrical positions on a face of the printed circuit board 46 opposing the magnet rotor 52 as described above and are each in the form of an approximately sector-shaped frame such that magnetically active conductor portions 44a and 44b thereof which extend in radial directions, and hence contribute to generation of a torque, include an angular width substantially equal to the angular width of each pole of the magnet rotor 52, as shown in FIGS. 11 and 14.

A cogging (reluctance) generating stator yoke or magnetic plate 53 made of an iron plate or the like is secured, for example, by adhesion, to a lower face of the printed circuit board 46. In particular, referring to FIG. 14, the stator yoke 53 is approximately sector-shaped in plan and has a cutaway portion 54 having an angular width $\theta$ which is determined in accordance with a condition given by the following expression $$T \leq m \cdot T \leq \theta < 2n \cdot T \qquad (1)$$

where T is the angular width of each pole of the magnet rotor, m is a positive integer ranging from 1 to 2N, P is the number of pairs of N and S poles of the magnet rotor, and n is an integer of at least 1 with 2n being equal to or smaller than the total number 2P of poles of the magnet rotor. In the present embodiment, the width $\theta$ of the cutaway portion 54 of the stator yoke 53 is 90 degrees because the magnet rotor 52 has 4 magnet poles. The stator yoke 53 is located on the printed circuit board 46 such that an end 53a of the stator yoke 53 indicated by a broken line is displaced by a distance smaller than one half or about one half of the angular width of each pole of the magnet rotor 52 (45 degrees), desirably by a distance equal to about one fourth (22.5 degrees) of the pole width as seen in FIG. 14, rearwardly in the direction of rotation of the rotor (in the direction indicated by arrow mark A) from the magnetically active conductor portion 44b of the armature coil 44-1.

In locating the stator yoke 53 on such a condition as described above, the cutaway portion may be formed within a range thereof as designated at 55, instead of the range of the cutaway portion 54, 53b shown in FIG. 14, with reference to the other magnetically active conductor portion 44a of the armature coil 44-1, or else within a range as designated at 56 with reference to the magnetically active conductor portion 44b of the other armature coil 44-2, or otherwise within a range as designated at 57 with reference to the other magnetically active conductor portion 44a of the armature coil 44-2, or alternatively a plurality of cutaway portions, that is, two cutaway portions, may be formed within any of the specified ranges of the stator yoke 53. Anyway, where the magnet rotor has four poles and the angular width of a cutaway portion is about 90 degrees, the cutaway portion can be positioned at any of such four positions spaced by an angle of 90 degrees from each other.

In the stator yoke 53 in which the cutaway portion 54 is formed, a trailing edge of the stator yoke 53 adjacent the cutaway portion 54 in the direction of rotation of the rotor may be inclined relative to the position as shown by the broken line 53a in FIG. 14 to a position shown by a solid line denoted at 53b such that the volume or area of the stator yoke 53 from a portion corresponding to the magnetically active conductor portion 44-1 of the armature coil 44b to the end 53a thereof indicated by the broken line in FIG. 14 may gradually decrease toward the direction opposite to the direction of rotation of the rotor (in the direction opposite to the direction indicated by arrow mark A) in order that the cogging torque may increase gradually to assure smooth rotation of the motor 30. By this construction, the cogging torque will be generated and gradually increase from an ideal position of the rotor and hence the rotor can rotate smoothly.

One reason why the width $\theta$ of the cutaway portion 54 of the stator yoke 53 is substantially equal to the width T of each pole of the field magnet or magnet rotor 52 in the present embodiment is that, if the cutaway portion 54 has such a width $\theta$, the armature coils 44-1, 44-2 and a position-detecting element 58 can be located within a range of the stator yoke 53. Accordingly, in this instance, the stator yoke 53 may be formed as a magnetic printed circuit board and hence a separate printed circuit board such as the printed circuit board 46 can be omitted. A 1-phase energized disk-type axial-flow brushless fan motor employing such a stator yoke as described just above will be hereinafter described in detail.

It is to be noted that, because in the present embodiment the position-detecting element 58 must necessarily be located at a position of the stator yoke 53 outside of the magnetically active conductor portion 44a or 44b of the armature coil 44-1 or 44-2, a perforation for accommodating the position-detecting element 58 therein is preferably formed at such a position of the stator yoke 53. Further, while in the present embodiment the printed circuit board 46 is located above the stator yoke 53, the relative positions thereof may be reversed.

The cogging generating stator yoke 53 has a perforation not shown formed therein so that the screw 47 may extend therethrough.

Electronic parts of an energization controlling circuit, such as a transistor 59 and a resistor 60, are located at portions of the lower face of the printed circuit board 46 of the stator armature 45 other than the portion opposing to the cogging generating stator yoke 53 and the portions opposing to the armature coils 44-1, 44-2, as seen in FIG. 11.

It is to be noted here that since circumferentially extending conductor portions 44c, 44d of the armature coils 44-1, 44-2 do not contribute to generation of a torque, the magnet rotor 52 may have a smaller outer radius by the width (radial dimension) of the outer conductor portion 44d. It is also to be noted that the magnetically active conductor portions 44a and 44b of the armature coils 44-1, 44-2 include an angle of 90 degrees because the magnet rotor 52 has 4-poles as described above. Further, the magnetic reluctance element 58 such as a Hall element or a Hall IC which is used as a position detecting element is located at a position on the circuit board 46 opposing the cutaway portion 54 below the magnetically active conductor portion 44a of the armature coil 44-2. The reason why the two armature coils 44-1, 44-2 are located at such symmetrical positions in the motor 30 of the embodiment is that rotational vibrations of the motor may be reduced thereby, but otherwise a single armature coil may be included in a motor.

Thus, for example, upon stopping or starting of the motor, the magnet rotor 52 is normally at a position in which the center thereof is retracted substantially by one fourth of the width of each pole of the magnet rotor 52 (that is, by an angle of 22.5 degrees because the magnet rotor 52 in the present embodiment has 4 poles) in the direction of rotation (as indicated by arrow mark A) from a position corresponding to the magnetically active conductor portion 44b of the armature coil 44-1 or 44-2 as seen from FIG. 14 because the cogging generating stator yoke 53 is located at such a specific position as described above on the printed circuit board 46 of the stator armature 45. In other words, where the cogging generating stator yoke 53 is located at one of the specific positions as described hereinabove, the magnet rotor 51 will stop at a position in which any one of the N and S poles thereof is opposed to the end 53b of the stator yoke 53 by attraction thereof. Accordingly, when the rotor 52 is in a stopped condition, the position-detecting element 58 always detects an N or S pole of the magnet rotor 52 and hence does not detect a dead point, and therefore, the magnet rotor 52 can be rotated continuously in a predetermined direction if the armature coils 44-1 and 44-2 are suitably energized by electric current flowing in a predetermined direction.

Although the provision of the cogging generating stator yoke 53 on the printed circuit board 46 will cause generation of cogging, according to the present invention, such cogging of the stator yoke 53 is effectively utilized to attain continuous rotation of the motor. Accordingly, only one position-detecting element is sufficient for the motor, and as a result, an inexpensive 1-phase energized disk-type brushless motor or disk-type axial-flow brushless fan motor can be obtained. Moreover, since the end of the stator yoke 53 adjacent the cutaway portion 54 is further cut away as indicated by the solid line 53b, that is, since the volume or area of the stator yoke 53 gradually decreases from a portion corresponding to the magnetically active conductor portion 44b of the armature coil 44-1 to the end 53a of the cutaway portion 54 located rearwardly of the conductor portion 44b in the direction of rotation of the rotor (in the direction of the arrow mark A) as at the end 53b, the cogging torque will appear and increase gradually and smoothly. Otherwise, the cogging torque would appear and increase abruptly if the end of the cutaway portion 54 in question extending in a radial direction, that is, if the cutaway portion 54 had such an end as indicated in the broken line denoted by 53a in FIG. 14. Accordingly, a 1-phase energized disk-type brushless motor or disk-type axial-flow brushless fan motor, which can rotate smoothly with reduced noise, can be obtained.

Figure 16:
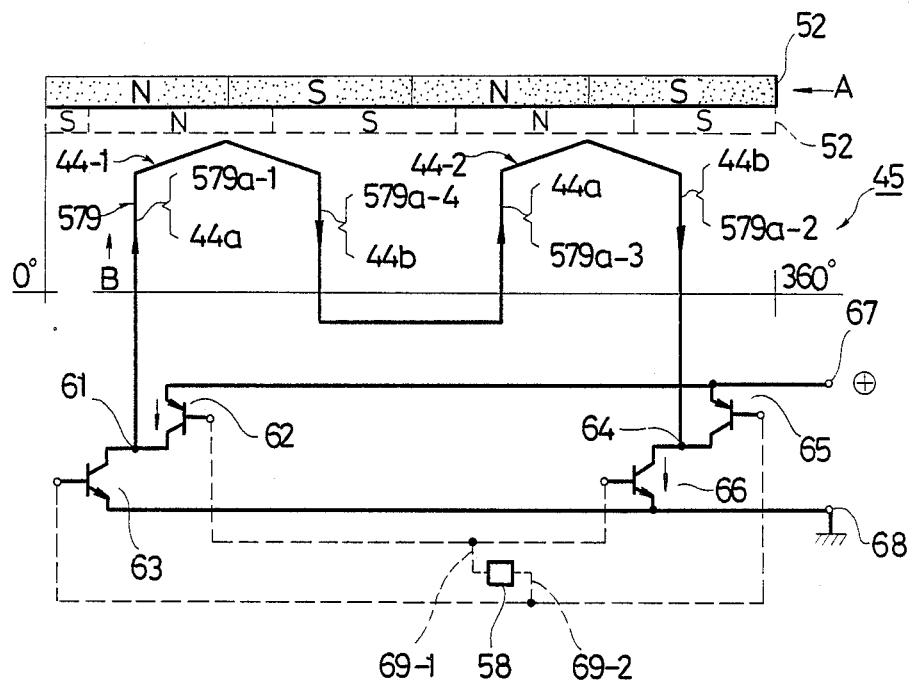
FIG. 16 is a developed view of the stator armature of FIG. 14 and the 4-pole magnet rotor of FIG. 15.

Reference is now had to FIG. 16 which is a developed view of the magnet rotor 52 and the stator armature 45 in the 4-pole, 2-coil, 1-phase reciprocally energized axial-flow brushless fan motor 30. The magnetically active conductor portions 44a, 44b of the armature coils 44-1, 44-2 which contribute to generation of a torque are located in an equidistantly spaced relationship by an electrical angle of 180 degrees (which correspond to a mechanical angle of 90 degrees in the present embodiment). The other of two terminals of the magnetically active conductor portion 44b of the armature coil 44-1 and one of the terminals of the magnetically active conductor portion 44a of the armature coil 44-2 are connected in common, while one of the terminals of the magnetically active conductor portion 44a of the armature coil 44-1 is connected to a junction point 61 between the collector of a transistor 62 and the collector of another transistor 63 both in the energization controlling circuit, and the other of terminals of the magnetically active conductor portion 44b of the armature coil 44-2 is connected to a junction point 64 between the collector of a transistor 65 and the collector of another transistor 66. The energization controlling circuit is constructed as a 1-phase reciprocating energization controlling circuit. The emitters of the transistors 62, 65 are connected to a positive power supply terminal 67 while the emitters of the transistors 63, 66 are grounded as at 68.

Output terminals 69-1, 69-2 of the position-detecting element 58 are connected to the energization controlling circuit. Accordingly, if the position-detecting element 58 detects an N pole of the magnet rotor 52, a signal is coupled from the output terminal 69-1 of the position-detecting element 58 to render the transistors 62, 66 conductive to cause electric current to flow in directions indicated by respective arrow marks through the armature coils 44-1, 44-2. As a result, a turning force in a direction indicated by an arrow mark A can be produced. On the contrary, if the position-detecting element 58 detects an S pole of the magnet rotor 52, then a signal is coupled from the output terminal 69-2 of the position detecting element 58 to render the transistors 63, 65 conductive, to cause electric current to flow in directions opposite to the directions indicated by the arrow marks through the armature coils 44-1, 44-2. As a result, a turning force in the direction indicated by the arrow mark A is produced again.

Figure 17:
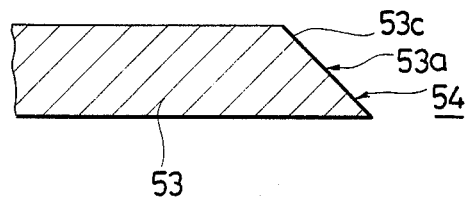
FIG. 17 is an enlarged vertical sectional view of the cogging generating element of FIG. 11.

While in the embodiment he trailing end of the the stator yoke 53 adjacent the cutaway portion 54 is cut obliquely to gradually decrease the area in plan view and hence the volume of the stator yoke 53, the volume of the stator yoke 53 may be decreased in a different manner. For example, the end 53a of the stator yoke 53 adjacent the cutaway portion 54 which is indicated in broken line in FIG. 14 may be cut obliquely relative to the thickness thereof to provide a tapered face 53c to the end 53a of the stator yoke 53 adjacent the cutaway portion 54, as shown in FIG. 17. Such a tapered face 53c may naturally be formed on the oblique end 53b of the stator yoke 53 in FIG. 14.

Figure 18:
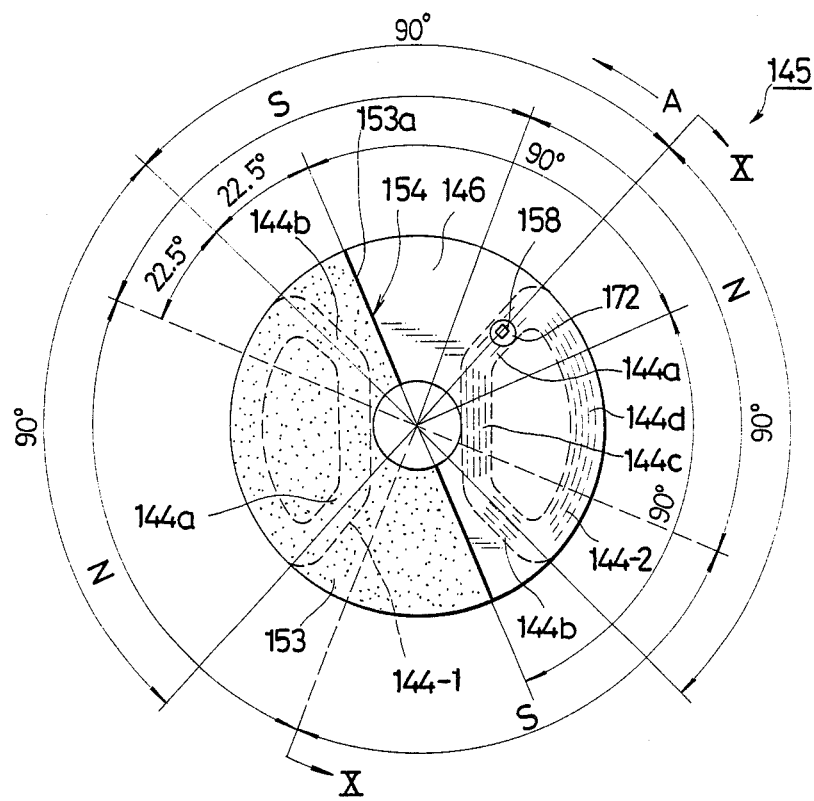
FIG. 18 is a similar view to FIG. 14 showing a stator armature including two armature coils and a modified cogging generating element.

Referring now to FIG. 18, there is shown an arrangement of a stator armature including two armature coils and a modified cogging generating element. In this figure, like parts or elements to those of the embodiment of FIGS. 11 to 17 are denoted by reference numerals the lower two digits of which are like to those of FIGS. 11 to 17. For example, a cogging generating magnetic plate or stator yoke 153 in FIG. 18 corresponds to the cogging generating magnetic plate or stator yoke 53. Similarly, like suffixes may be added to reference numerals. This also applies to any and all modifications or embodiments described below. In some cases, like parts or elements may be similarly denoted but with a suffix '.

In the arrangement of FIG. 18, a cogging generating magnetic plate or stator yoke 153 has a cutaway portion 154 the width $\theta$ of which is here equal to 180 degrees. It is apparent that this width also meets the condition represented by the expression (1) given hereinabove. Since the stator yoke 153 has such a sufficiently large cutaway portion 154, electric parts included in an energization controlling circuit can be located on the portion of the printed circuit board 146 opposing the cutaway portion 154.

Also in the arrangement of FIG. 18, one end 153a of the cutaway portion 154 of the stator yoke 153 is shown displaced by a distance equal to about one fourth of the width of each pole of the 4-pole magnet rotor (not shown), that is, an angle of 22.5 degrees, rearwardly in the direction of rotation of the rotor (in the direction indicated by an arrow mark A) from one 144b of magnetically active conductor portions 144a, 144b of one 144-1 of two armature coils 144-1, 144-2 similarly as in the arrangement of FIGS. 11 to 16.

It will be appreciated that where the magnet rotor has four poles and the width of a cutaway portion is about 180 degrees, such a cutaway portion as denoted at 154 may otherwise be formed in a different range of the stator yoke 153 such that the trailing end 153a adjacent the cutaway portion 154 may be displaced by an angle of 90, 180 or 270 degrees in a counterclockwise direction from the position shown in FIG. 18 relative to the printed circuit board 146.

It is to be noted that in the arrangement of FIG. 18, position-detecting element 158 is accommodated in a perforation 172 formed at a portion of the printed circuit board 146 opposing the magnetically active conductor portion 144a of the armature coil 144-2.

Figure 19:
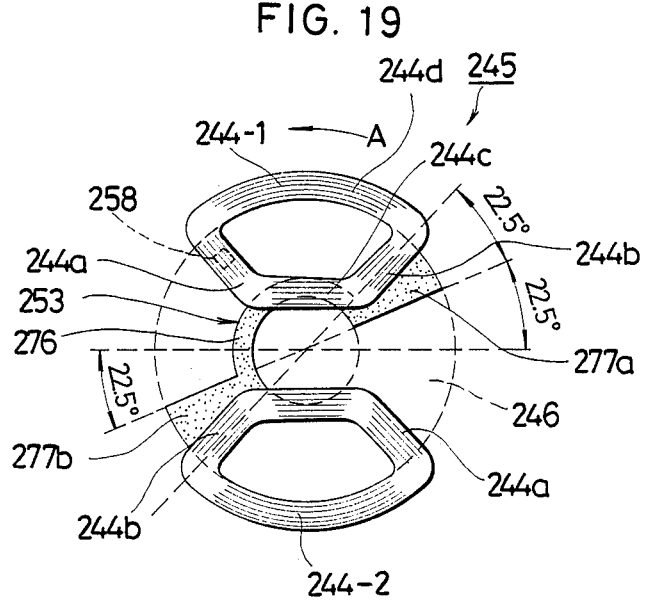
FIGS. 19 and 20 are similar views, in a somewhat reduced scale, showing a stator armature including two armature coils and further modified cogging generating elements.

Referring now to FIG. 19, an arrangement of a stator armature including two armature coils and a further modified cogging generating element or stator yoke where the motor includes a 4-pole magnet rotor is shown. The stator yoke 253 has a pair of magnetically attractable sectoral projections 277a, 277b and a semi-circular interconnecting portion 276. The projections 277a, 277b each have a width of 22.5 degrees and are located in a symmetrical relationship, that is, in a spaced relationship by an angle of 180 degrees around the center thereof which coincides with the center of the motor. Accordingly, a pair of cutaway portions each having a width of 157.5 degrees are defined by and between the sectoral projections 277a, 277b, and hence it is apparent that the arrangement of FIG. 19 also meets the condition given by the expression (1). It is to be noted that the width $\theta$ of the projections 277a, 277b is not necessarily equal to 22.5 degrees and may be a little greater or smaller than 22.5 degrees.

The stator yoke 253 is located on a printed circuit board 246 such that leading ends or edges of the projections 277a, 277b in a direction of rotation of the motor (in the direction indicated by arrow mark A) are just opposed to ones 244b of magnetically active conductor portions 244a, 244b of the armature coils 244-1, 244-2 and accordingly the opposite trailing ends or edges of the projections 277a, 277b are displaced by an angle equal to about one fourth of the width of each pole of the 4-pole magnet rotor (22.5 degrees) from the magnetically active conductor portions 244b of the armature coils 244-1, 244-2.

Figure 20:
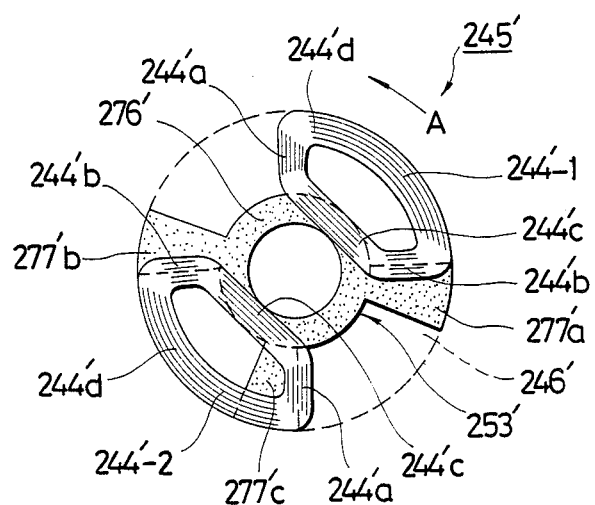

A modified form of the stator yoke 253 is shown in FIG. 20. The stator yoke 253' is only different from the stator yoke 253 in that it has an additional sectoral projection 277'c extending perpendicularly to sectoral projections 277'a, 277'b from an annular interconnecting portion 276'. The stator yoke 253' is similarly positioned on a printed circuit board 246', and thus a leading edge of the projection 277'c is opposed to a magnetically active conductor portion 244'a of an armature coil 244'-2.

Also in the arrangements of FIGS. 19 and 20, the motor can start itself and rotate smoothly in a similar manner as in the preceding arrangements.

It is to be noted that neither of the stator yokes 253 and 253' has a projection opposing a magnetically active conductor portion 244a or 244'a of the armature coil 244-1 or 244'-1. This is because a position-detecting element such as denoted at 258 in FIG. 19 must be located at such a position on the printed circuit board 246 or 246'. Here, if the printed circuit board 246, 246' is made of a material which allows observation of an article on a reverse side therethrough, the armature coils 244-1, 244-2, 244'-1, 244'-2 and the cogging generating stator yoke 253, 253' can be correctly positioned on the printed circuit board 246, 246' very easily.

The types of cogging generating stator yokes shown in FIGS. 19 and 20 can be similarly applied to 1-phase brushless motors which include a magnet rotor having 6, 8 or more magnet poles. In such applications, a cogging generating stator yoke may be constituted such that two or more sectoral projections each having an angular width substantially equal to one fourth of the width of each pole of the magnet rotor and defining therebetween cutaway portions, the angular width of which is determined in accordance with the expression (1) above extend radially from two or more positions of an annular center ring which may be spaced at random by an angle substantially equal to the angular width or to two or more times of the angular width of each pole of the magnet rotor, and the stator yoke may be located such that a leading end of each projection in a direction of rotation of the magnet rotor is positioned at a position opposing to a magnetically active conductor portion of an armature coil or at a corresponding same phase position, similarly as in FIGS. 19 and 20.

The several arrangements described above with reference to FIGS. 11 to 20 all relate to 1-phase coreless disk-type axial-flow brushless fan motors which include a magnet rotor having four poles. Now, a similar motor but including a magnet rotor having six poles will be described with reference to FIGS. 21 to 23.

Figure 1:
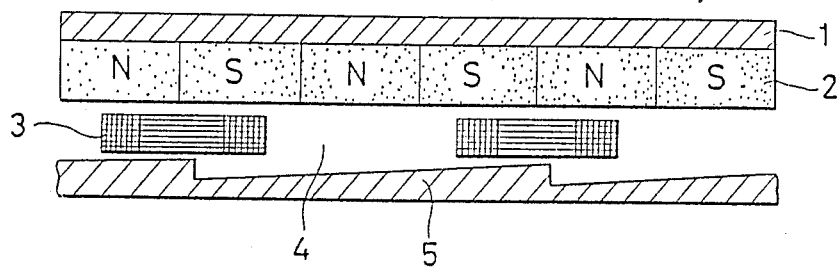
FIG. 1 is a developed illustrative view of a rotor and a stator of a 1-phase energized coreless-type brushless motor illustrating a conventional means for generating a cogging torque.
Figure 2:
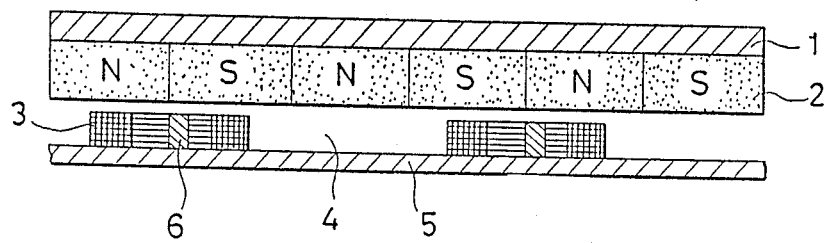
FIG. 2 is a similar view but illustrating another conventional means for generating a cogging torque.
Figure 3:
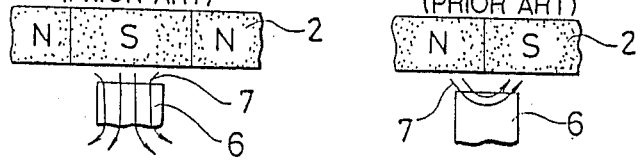
FIG. 3 is an illustrative view of part of the motor of FIG. 2 illustrating a stopping position of the rotor.
Figure 4:
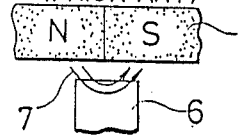
FIG. 4 is a similar view but illustrating a magnetic flux around a dead point of the motor of FIG. 2.
Figure 5:
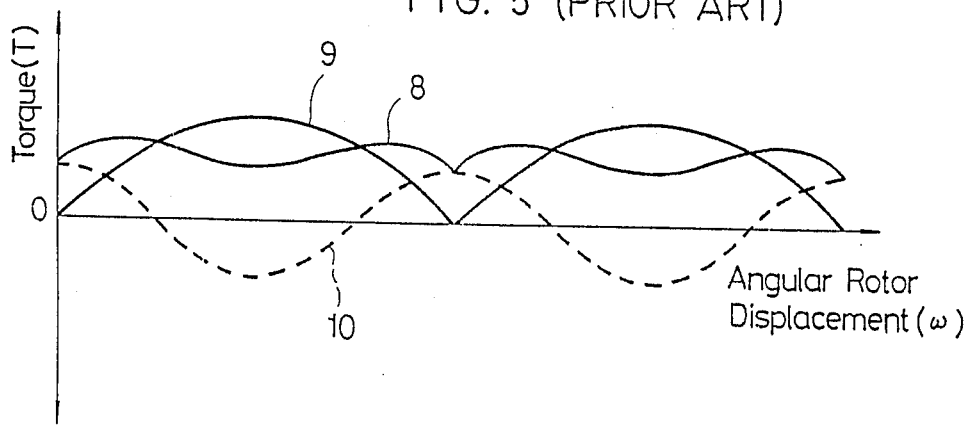
FIG. 5 is a graph showing an ideal composite torque curve for a 1-phase energized disk-type brushless motor.
Figure 6:
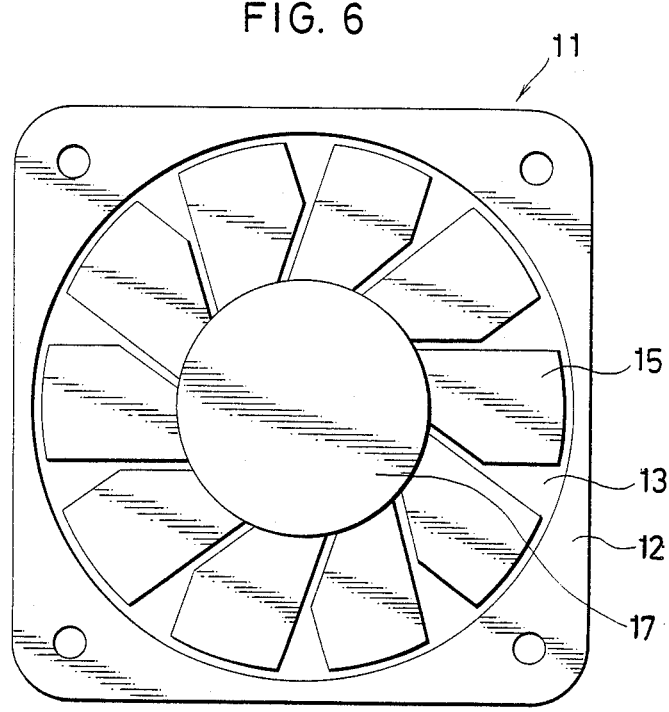
FIG. 6 is a plan view of a typical conventional 1-phase energized coreless disk-type axial-flow brushless fan motor.
Figure 7:
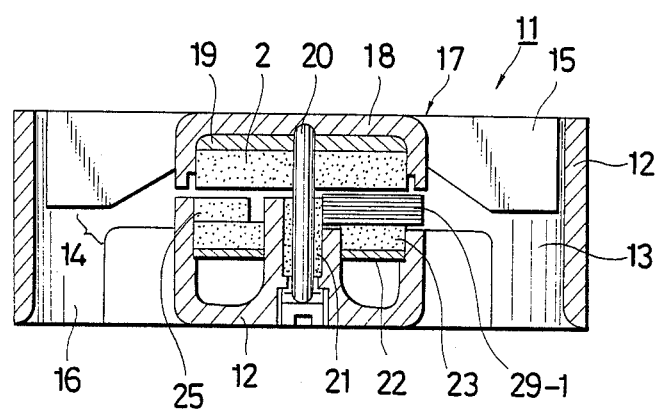
FIG. 7 is a vertical sectional view of the motor of FIG. 6.
Figure 8:
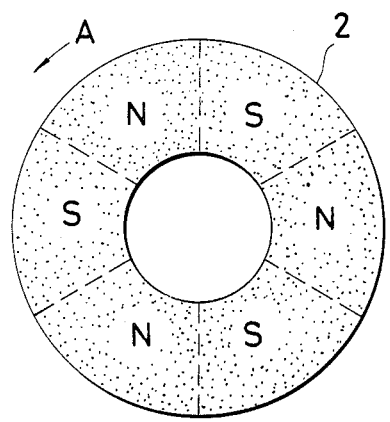
FIG. 8 is a bottom plan view of a 6-pole field magnet.
Figure 9:
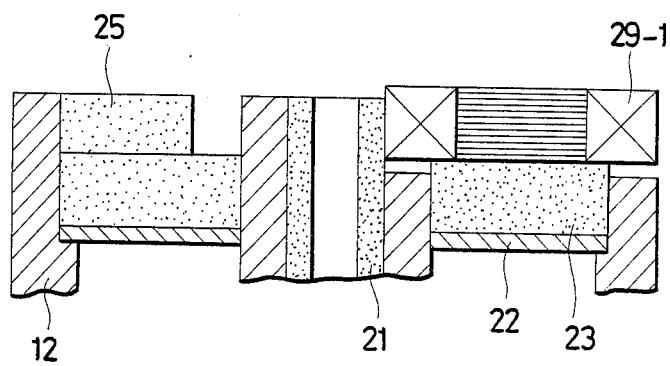
FIG. 9 is an enlarged vertical sectional view of the stator of the motor of FIG. 7.
Figure 10:
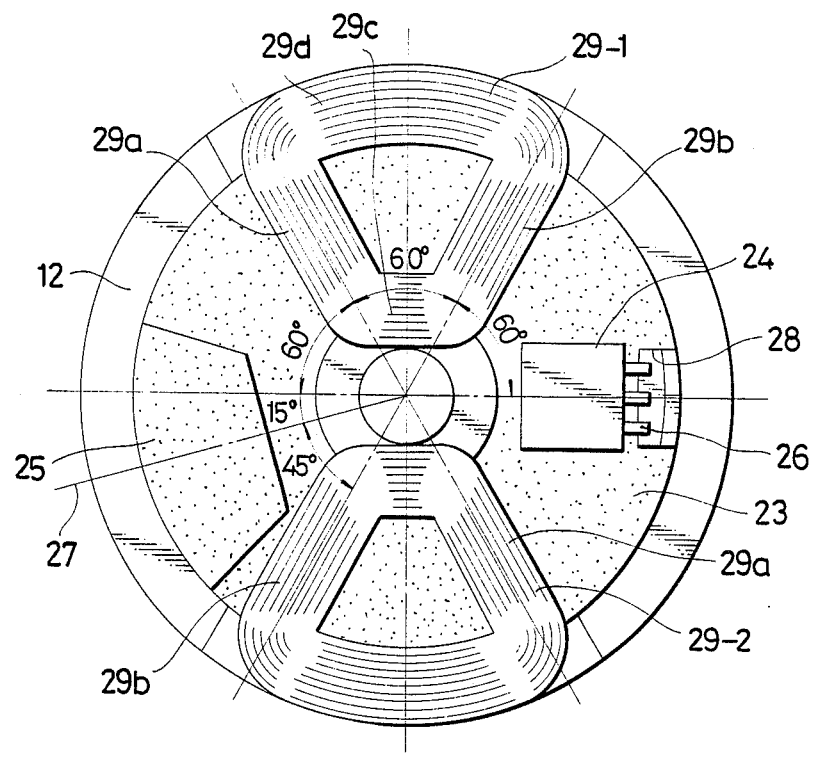
FIG. 10 is a plan view of a stator armature of the motor of FIG. 6.
Figure 21:
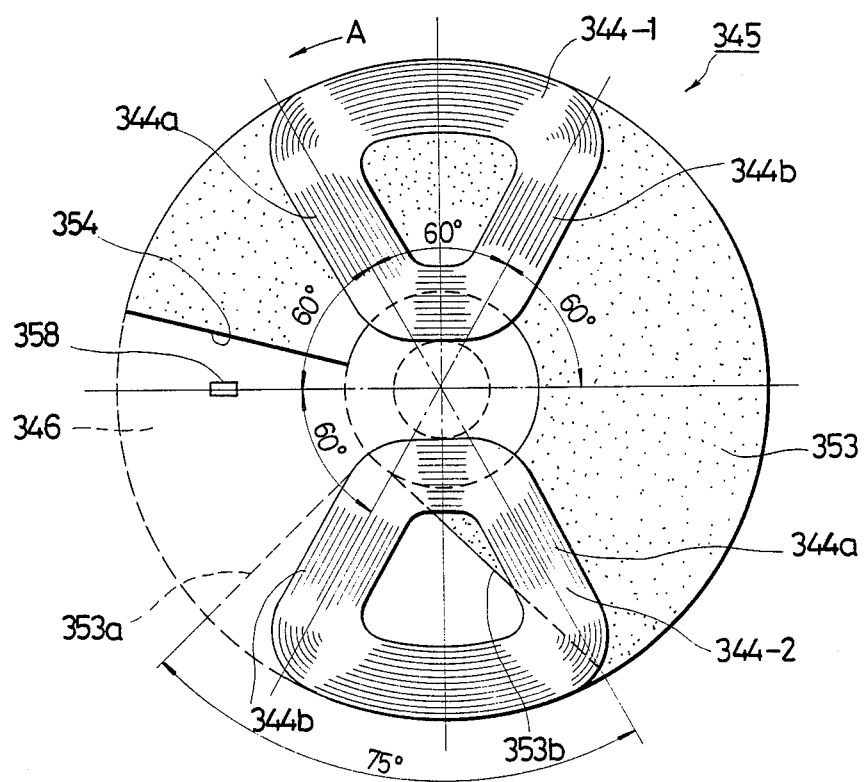
FIG. 21 is a similar view, in a somewhat enlarged scale, showing a stator armature including two armature coils and a cogging generating element where a 6-pole annular magnet rotor is employed in the motor of FIG. 11.

Referring first to FIG. 21, there is shown, in plan, a stator armature where the motor includes a 6-pole annular magnet rotor as shown in FIG. 8. Armature coils 344-1, 344-2 are each in the form of an approximately sector-shaped frame, and the magnetically active conductor portions 344a, 344b which contribute to generation of a torque include a width of 60 degrees. The armatures 344-1, 344-2 are located in a symmetrical relationship at two different positions spaced by an angle of 180 degrees on a printed circuit board 346. A cogging generating stator yoke 353 having a cutaway portion 354 having a width of 60 degrees is securely mounted on a lower face of the printed circuit board 346 and located at such a position that an end 353a thereof shown in a broken line is spaced by an angular width equal to about one fourth of the width of each pole of the magnet rotor, that is, by an angle of 15 degrees, rearwardly from the magnetically active conductor portion 344b of the armature coil 344-2 in the direction of rotation of the rotor (in the direction indicated by arrow mark A).

In the arrangement of FIG. 21, the end 353a of the stator yoke 353 may be further cut away from the position indicated by the broken line such that a cut edge 353b may extend over an angle of 75 degrees from a portion of an inner periphery shown in a broken line of the stator yoke 353 intersecting the broken line of the end 353a to a portion of an outer periphery of the stator yoke 353 corresponding to the magnetically active conductor portion 344a of the armature coil 344-2. Thus, the volume and area of the stator yoke 353 between the end 353a of the cutaway portion 354 and the magnetically active conductor portion 344a (this may be the other magnetically active conductor portion 344b) of the armature coil 344-2 located forwardly of the end 353a shown by the broken line in the direction of rotation of the rotor (in the direction indicated by arrow mark A) gradually decreases toward the direction opposite to the direction of the arrow mark A.

Thus, in this arrangement, the area of the stator yoke 353 gradually increases toward the direction of rotation of the rotor from the end 353a thereof shown by the broken line. Accordingly, the cogging torque caused by the stator yoke 353 will increase gradually so that a maximum starting torque will be produced at the position of the magnetically active conductor portion 344a of the armature coil 344-2. Therefore, a 1-phase disk-type brushless motor of a high efficiency can be obtained.

A position-detecting element 358 is located at a mid position on the printed circuit board 346 between the magnetically active conductor portion 344a of the armature coil 344-1 and the magnetically active conductor portion 344b of the armature coil 344-2. Where the position-detecting element 358 is located at such a specific position on the printed circuit board 346 as described above, the stator yoke 353 is not located at a position on the printed circuit board 346 opposing the position-detecting element 358, that is, the position-detecting element 358 opposes the cutaway portion 354 of the stator yoke 353. Accordingly, terminals of the element 358 can be projected and soldered to the bottom face of the printed circuit board 346.

Figure 22:
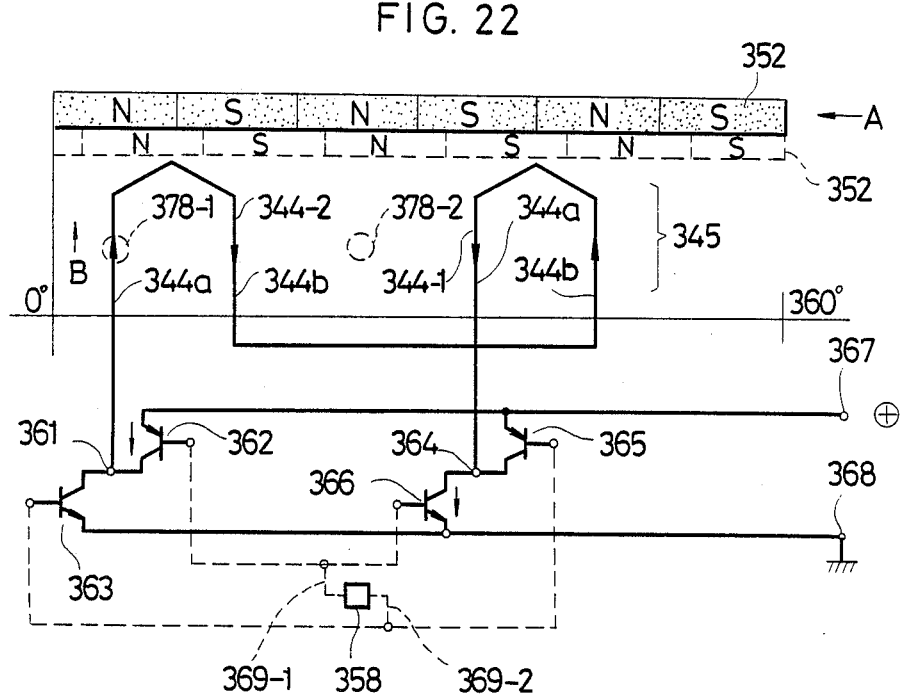
FIG. 22 is a developed view of the stator armature of FIG. 21 and the 6-pole magnet rotor of FIG. 8.

FIG. 22 is a developed view of the magnet rotor 352 and the stator armature 345. As seen in FIG. 22, the position-detecting element 358 which should be located at a position, for example, at a position indicated by a circle 378-1 of a broken line, on the printed circuit board 346 opposing the magnetically active conductor portion 344a of the armature coil 344-2 is here located at a corresponding same phase position on the printed circuit board 346 as is indicated by another broken line circle 378-2 (also refer to FIG. 22).

Figure 23:
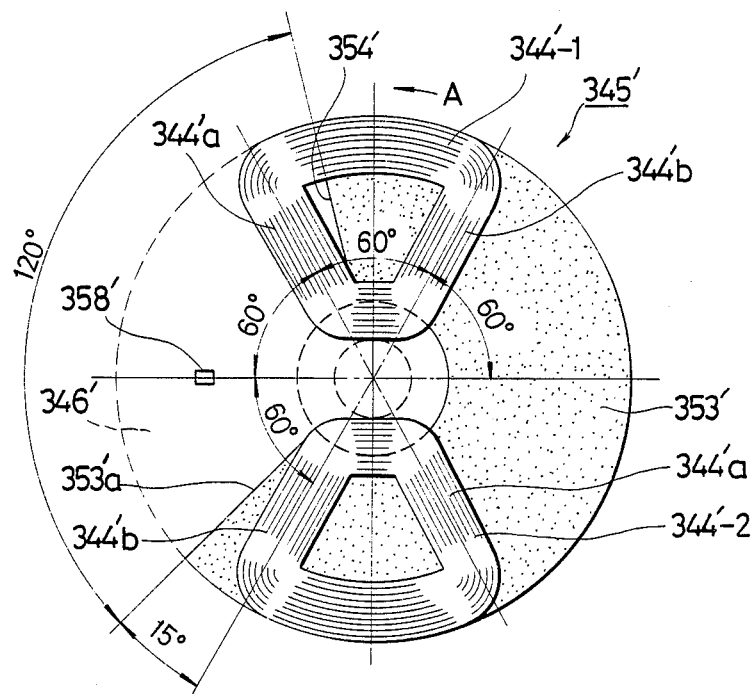
FIG. 23 is a view similar to FIG. 21, in a somewhat reduced scale, showing a stator armature including two armature coils and a modified cogging generating element.

A modified form of the stator yoke 353 of FIG. 21 is shown in FIG. 23. The stator yoke 353' of FIG. 23 is different from the stator yoke 353 of FIG. 21 in that the width of a cutaway portion 254' of the stator yoke 353' is 120 degrees, that is, twice of the width of the cutaway portion 354 of the stator yoke 353 and that an end 353'a of the stator yoke 353' corresponding to the end 353a of the stator yoke 353 has no such further cut edge as the edge 353b. This arrangement apparently meets the condition represented by the expression (1) above. The stator yoke 353' is located such that the end 353'a thereof is spaced similarly by an angle of about 15 degrees rearwardly in the direction of rotation of the rotor (in the direction indicated by arrow mark A) from a magnetically active conductor portion 344'b of an armature coil 344'-2.

In the arrangements of FIGS. 21 and 23, a position detecting element 358, 358' is located at a portion of a printed circuit board 346, 346' opposing the cutaway portion 354, 354' of the stator yoke 353, 353' because of the reason given hereinabove.

It will be appreciated that, where the magnet rotor has six poles in this manner, the stator yoke 353, 353' may have an additional such cutaway portion or portions and may be displaced by an angle of 60, 120, 180, 240 or 300 degrees in a counterclockwise direction relative to the printed circuit board 346, 346' so that the end 353a, 353'a thereof may be spaced by an angle of 15 degrees rearwardly in the direction of rotation of the rotor (in the direction indicated by arrow mark A) from a position corresponding to the magnetically active conductor portion 344b, 344'b of the other armature coil 344-1, 344'-1, respectively, or a corresponding same phase position. Further, the width θ of the cutaway portion 354, 354' of the stator yoke 353, 353' may otherwise be 180 or 240 degrees in accordance with the condition defined by the expression (1) above.

Figure 24:
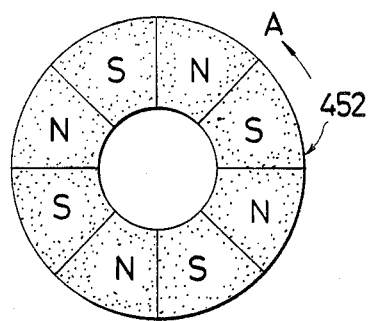
FIG. 24 is a bottom plan view of an 8-pole annular magnet rotor.

FIG. 24 illustrates, in plan, a magnet rotor 452 having eight poles. Now, a 1-phase coreless disk-type axial-flow brushless fan motor including such a magnet rotor 452 as shown in FIG. 24 will be described with reference to FIG. 25.

A pair of armature coils 444-1, 444-2 of a stator armature 445 having magnetically active conductor portions 444a, 444b which contribute to generation of a torque and include a width substantially equal to the width of each pole of the magnet rotor 452, that is, an angle of 45 degrees. The armature coils 444-1, 444-2 are located at symmetrical positions spaced by an angle of 180 degrees on a printed circuit board 446. A cogging generating stator yoke 453 having a cutaway portion 454 having a width of 45 degrees is securely mounted on a lower face of the printed circuit board 446 and located at such a position that an end 453a thereof is spaced by one fourth of the width of each pole of the magnet rotor 452, that is, by an angle of 11.25 degrees, rearwardly from the magnetically active conductor portion 444b of the armature coil 444-2 in the direction of rotation of the magnet rotor 452 (in the direction indicated by arrow mark A).

Figure 25:
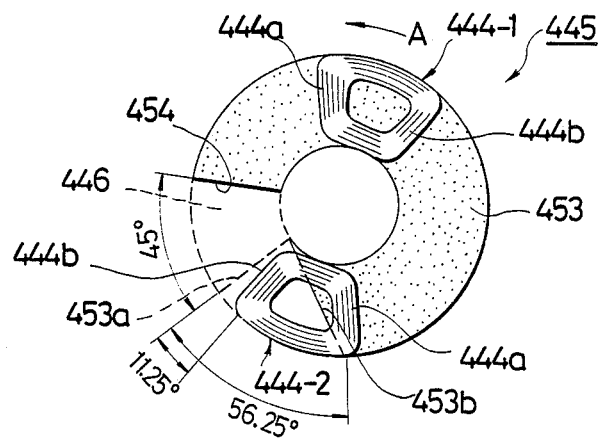
FIGS. 25 and 26 are similar views to FIG. 23, in a reduced scale, showing a stator armature including two armature coils and further modified cogging generating element.

In the arrangement of FIG. 25, the end 453a of the stator yoke 453 may be further cut away from the position indicated by a broken line such that a cut edge 453b extends over an angle of 56.25 degrees from a portion of an inner periphery shown in a broken line of the stator yoke 453 intersecting the broken line of the end 453a to a portion of an outer periphery of the stator yoke 453 corresponding to the magnetically active conductor portion 444a of the armature coil 444-2. Thus, the volume and area of the stator yoke 453 between the end 453a of the cutaway portion 454 and the magnetically active conductor portion 444a of the armature coil 444-2 located forwardly of the end 453a shown by the broken line in the direction of rotation of the rotor (in the direction of the arrow mark A) gradually decreases toward the direction opposite to the direction of the arrow mark A.

Figure 26:
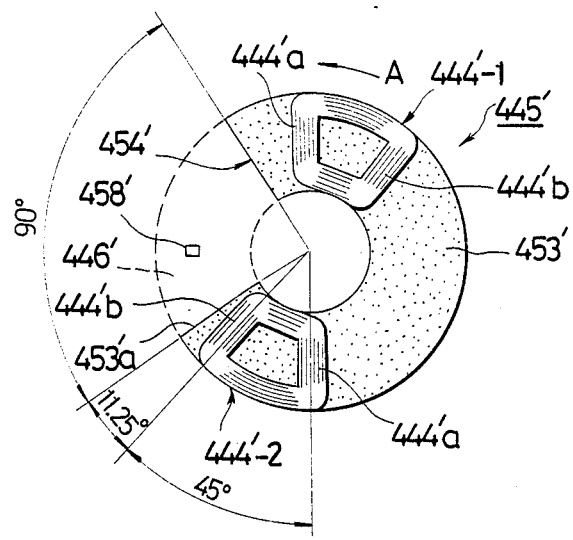

A modified form of the stator yoke 453 of FIG. 25 is shown in FIG. 26. The stator yoke 453' of FIG. 26 is different from the stator yoke 453 of FIG. 25 in that the width of a cutaway portion 454' of the stator yoke 453' is 90 degrees, that is, twice of the width of the cutaway portion 454 of the stator yoke 453 and that an end 453'a of the stator yoke 453' corresponding to the end 453a of the stator yoke 453 has no such further cut edge as the edge 453b. This arrangement apparently meets the condition represented by the expression (1) above. The stator yoke 453' is located such that the end 353'a thereof is spaced similarly by an angle of 11.25 degrees rearwardly in the direction of rotation of the rotor (in the direction indicated by arrow mark A) from a magnetically active conductor portion 444'b of an armature coil 444'-2.

In the arrangements of FIGS. 25 and 26, a position-detecting element such as denoted at 458' in FIG. 26 is located at a portion of a printed circuit board 446, 446' opposing to the cutaway portion 454, 454' of the stator yoke 453, 453' because of the reason given hereinabove.

It will be appreciated that, where the magnet rotor has eight poles in this manner, the stator yoke 453, 453' may have an additional such cutaway portion or portions and may be displaced by an angle of 45, 90, 135, 180, 225, 270 or 315 degrees in a counterclockwise direction from the position shown in FIG. 25 or 26 relative to the printed circuit board 446, 446'. Further, the width θ of the cutaway portion 454, 454' of the stator yoke 453, 453' may otherwise be 135, 180, 225 or 270 degrees in accordance with the condition defined by the expression (1) above.

While all the embodiments described above include a pair of armature coils for a stator armature, a 1-phase energized coreless disk-type axial-flow brushless fan motor which contains a single armature coil for a stator armature is also possible. A brushless motor including a single armature coil can naturally start itself and rotate, if such a cogging generating means as described hereinabove is used therein. However, since a high torque cannot be produced where a motor includes a single armature coil, the motor is not suitable for practical use as a disk-type brushless fan motor of a size of 4 to 6 cm having an air blowing function. Accordingly, at least two armature coils are required normally.

Where two armature coils are involved, a disk-type axial-flow brushless fan motor may possibly be inferior in balance in rotation if the two armature coils are not positioned correctly. Besides, in the case of a motor containing two armature coils, a winding step increases for an additional one of the two armature coils, resulting in increase in production cost, and two soldering steps or operations increase (this is because each armature coil has two terminals at opposite ends of a winding which must be soldered to predetermined portions of a printed circuit board), deteriorating the mass-productivity of motors accordingly. This will cause a drawback that the cost of disk-type axial-flow brushless fan motors will become high.

Thus, if a motor containing a single armature coil therein can generate substantially a same torque as can be generated by such various motors containing two armature coils as described hereinabove, (1) the difficulty in positioning the armature coil can be eliminated to allow production of a disk-type axial-flow brushless fan motor having a good balance in rotation and to allow the armature coil to be installed rapidly in position; (2) the armature coil can be produced by a single step at a reduced cost, allowing mass-production of armature coils at a lower cost than ever; (3) soldering steps of terminals of the armature coil can be reduced to allow rapid mass-production of armature coils at a lower cost; (4) a motor can start itself with a single position detecting element, allowing motors to be produced at a low cost; and (5) a coreless disk-type axial-flow brushless fan motor which is good in performance and produces very low turning noises can be produced in a mass at a low cost.

Figure 27:
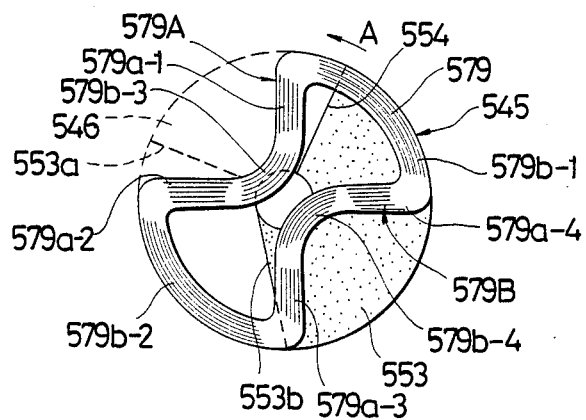
FIG. 27 is a similar view but showing a stator armature including a single armature coil of a specific form and a yet further modified cogging generating element where a 4-pole annular magnet rotor of FIG. 15 is employed.

FIG. 27 is a plan view showing a single armature coil 579 of a specific configuration constituting a stator armature 545. The armature coil 579 is in the form of a gourd-shaped frame so that it may be suitably used with the 4-pole magnet rotor 52 having four alternate N and S poles as shown in FIG. 15. The armature coil 579 is also located on a printed circuit board not shown.

Conventionally, where a 4-pole magnet rotor is used, two armature coils each having a pair of magnetically active, radially extending conductor portions which contribute to generation of a torque and include a width of 90 degrees, such as the armature coils 44-1, 44-2 shown in FIG. 14, must be located at symmetrical positions spaced by an angle of 180 degrees around the center of the motor. To the contrary, the arrangement of FIG. 27 is different from the conventional arrangements in that it does not include two separate armature coils such as denoted at 44-1, 44-2 in FIG. 14 but includes a single armature coil 579 of a specific configuration to allow the armature coil 579 to act as such two separate armature coils so that a substantially equal torque may be generated. Such a little difference, however, will make a remarkable difference in effect in a motor which includes only a small number of components.

Figure 28:
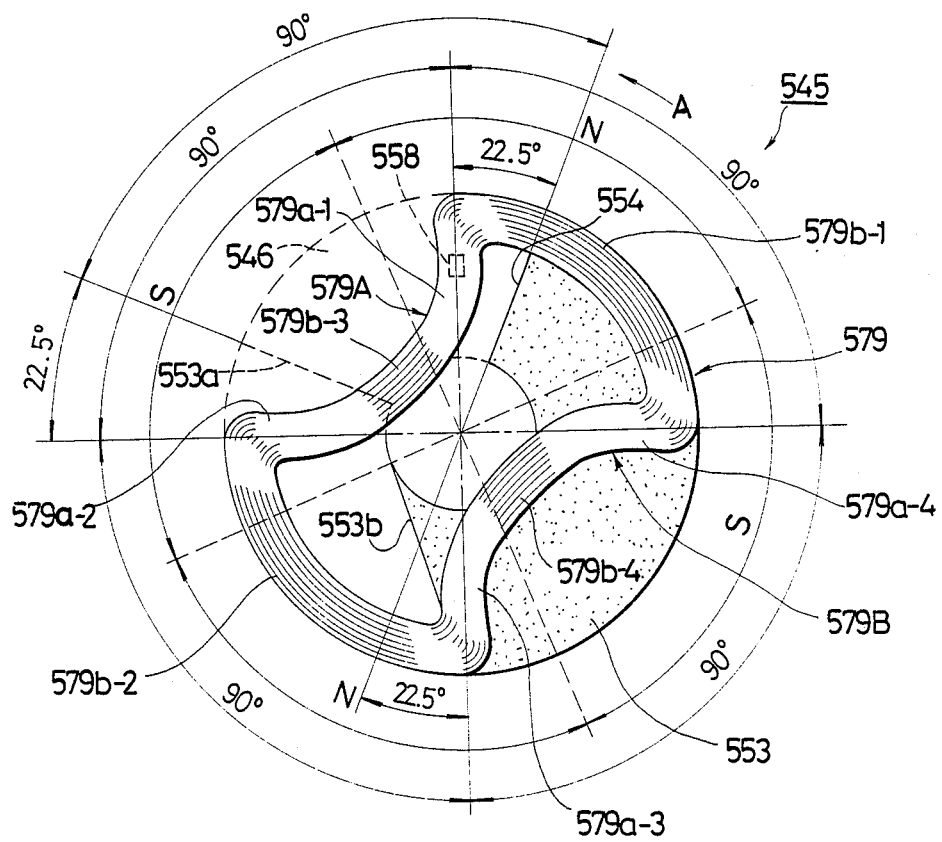
FIG. 28 is a similar view, in an enlarged scale, of the arrangement of FIG. 27.

The armature coil 579 shown in FIG. 27 has four substantially radially extending magnetically active conductor portions 579a-1, 579a-2, 579a-3, 579a-4 which contribute to generation of torque, two circumferentially extending outer conductor portions 579b-1, 579b-2, and inner conductor portions 579b-3, 579b-4 between the magnetically active conductor portions 579a-1 and 579a-2 and between the magnetically active conductor portions 579a-3 and 579a-4, respectively. The conductor portions 579b-1, 579b-2, 579b-3 and 579b-4 do not contribute to generation of torque. It is to be noted that the armature coil 579 of the specific configuration can be readily mass-produced by a winder, but where such armature coils to be produced are small in quantity and are thus produced by manual operation, they may be produced first by winding a wire into a rectangular configuration, then pressing conductor portions thereof, such as denoted at 579b-3 and 579b-4, toward each other until such a configuration as seen in FIG. 27 is reached, and finally solidifying them in this state. In FIG. 28 which is an enlarged view of FIG. 27, reference characters N and S are added around the armature coil 579 in order that relations of the armature coil 579 to the N and S poles of the magnet rotor may readily be seen therefrom.

A cogging generating stator yoke 553 is located on a lower face of the printed circuit board 546 and has a cutaway portion 554 having a width of 90 degrees as in the arrangement shown in FIG. 14. The stator yoke 553 is located such that, similarly as in the arrangement of FIG. 14, an end 553a of the cutaway portion 554 thereof is spaced by an angle substantially equal to one fourth of the width of each pole of the magnet rotor, that is, by an angle of 22.5 degrees here, rearwardly from the magnetically conductor portion 579a-2 of the armature coil 579 in the direction of rotation of the magnet rotor (indicated by arrow mark A).

The end 553 of the stator yoke 553a adjacent the cutaway portion 554 may be further cut away from the position indicated by a broken line such that an edge 553b thus cut may extend over an angle of 112.5 (90+22.5) degrees in a direction of rotation (indicated by an arrow mark A) from a portion of an inner periphery shown in a broken line of the stator yoke 553 intersecting the broken line of the end 553a to a portion of an outer periphery of the stator yoke 553 corresponding to the magnetically active conductor portion 579a-3 of the armature coil 579. Thus, the volume and area of the stator yoke 553 between the end 553a of the cutaway portion 554 and the magnetically active conductor portion 579a-3 of the armature coil 579 located forwardly of the end 553a shown by the broken line in the direction of rotation of the rotor gradually decreases toward a direction opposite to the direction of the arrow mark A.

It is to be noted that, in FIG. 28, a position detecting element 558 is located in the cutaway portion 554 of the stator yoke 553, opposing the printed circuit board 546 below the magnetically active conductor portion 579a-1 of the armature coil 579.

In the specific configuration of the armature coil 279, a conductor portion 579A including the magnetically active conductor portions 579a-1 and 579a-2 (as well as the magnetically inactive conductor portion 579b-3 which does not contribute to generation of a torque) and another conductor portion 579B including the magnetically active conductor portions 579a-3 and 579a-4 (as well as the magnetically inactive conductor portion 579b-4) can each oppose to two N and S poles which are located at symmetrical positions spaced by an angle of 180 degrees from the other two N and S poles, respectively. Moreover, the magnetically active conductor portions 579a-1 and 579a-4, 579a-2 and 579a-3 include a width substantially equal to the width of each pole of the magnet rotor. Accordingly, a similar turning torque to that obtained by a conventional arrangement of two armature coils such as the armature coils 44-1, 44-2 described above can be generated with the single armature coil 579. Thus, the armature coil 579 of FIG. 27 (and FIG. 28) is characterized in its configuration such that the two conductor portions 579A, 579B which contribute to generation of a torque can each oppose to two N and S poles of the magnet rotor so that electric current may flow in a same direction in the conductor portions 579A, 579B (this also applies to an armature 680 which will be hereinafter described). More particularly, the conductor portions 579A, 579B of the the armature coil 579 each correspond to two magnetically active conductor portions of a conventional armature coil (such as the armature coil 44-1) which are extended so that they may oppose different poles of the magnet rotor (again, this also applies to the armature 680).

Thus, the effects listed above can be attained readily by employing the armature coil 579 having such a characteristic as described above.

The reason why the effects can be attained readily is that the magnet rotor has four poles (or otherwise may have eight poles), and those effects cannot be attained easily where the magnet rotor has six poles or ten or more poles. This is because, where the magnet rotor has ten or more poles, there will be some waste and the magnet rotor will be very expensive, and where the magnet rotor has 6 poles, the configuration of an armature coil which is to be used with the 6-pole magnet rotor will be complicated.

Referring now to FIG. 16 which is a developed view of the armature coils 44-1, 44-2 of FIG. 14 and the armature coil 579 of FIG. 27 relative to the magnet rotor 52, the magnetically active conductor portion 579a-1 of the armature coil 579 corresponds to the magnetically active conductor portion 44a of the armature coil 44-1, the conductor portion 579a-4 to the magnetically active conductor portion 44b of the armature coil 44-1, the conductor portion 579a-3 to the magnetically active conductor portion 44a of the armature coil 44-2, and the conductor portion 579a-2 to the magnetically active conductor portion 44b of the armature coil 44-2.

Now, it can be apparently seen from FIG. 16 that if electric current flows, for example, in a direction of an arrow mark B, through the conductor portion 579a-1 of the armature coil 579 and through the conductor portion 44a of the armature coil 44-1, electric current flows in the same direction also through the magnetically active conductor portion 579a-3 of the armature coil 579 and the magnetically active conductor portion 44a of the armature coil 44-2 which are located at respective symmetrical positions spaced by an angle of 180 degrees from the conductor portions 579a-1 and the 44a, respectively. Since the magnetically active conductor portions 579a-1, 579a-3 of the armature coil 579 and the magnetically active conductor portions 44a of the armature coils 44-1, 44-2 all oppose the N poles of the magnet rotor 52, a turning torque in a predetermined direction can be generated by those conductor portions. Thus, it is apparent that the two armature coils 44-1, 44-2 can be replaced by the single armature coil 579 which can be formed easily.

On the other hand, a developed view of the two armature coils 344-1, 344-2 arranged at symmetrical positions spaced by an angle of 180 degrees as shown in FIG. 21 where the 6-pole magnet 2 as shown in FIG. 8 is used is shown in FIG. 22. Referring now to FIG. 22, while the magnetically active conductor portion 344a of the armature coil 344-2 is opposed to an N pole of the magnet rotor 2 and electric current flows in a direction of an arrow mark B through the conductor portion 344a of the armature coil 344-2, the magnetically active conductor portion 344a of the other armature coil 344-1 which extends in a symmetrical relationship spaced by an angle of 180 degrees from the magnetically active conductor portion 344a of the armature coil 344a-2 is opposed to an S pole and thus electric current flows in a direction opposite to the direction of the arrow mark B through the conductor portion 344a of the armature coil 344-1.

Accordingly, where the 6-pole magnet rotor 2 is used, it is not easy to combine the two armature coils 344-1, 344-2 into a single armature coil as in the armature coil 579 shown in FIG. 27.

Thus, as already mentioned, such an armature coil as the armature coil 579 is effective for a magnet rotor having four poles or eight poles. A magnet rotor having eight poles in combination with an armature coil of such a specific configuration will be hereinafter described.

Figure 29:
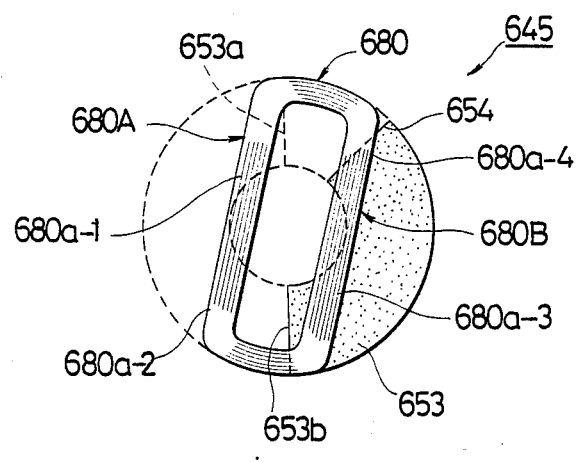
FIG. 29 is a similar view, in a reduced scale, showing a stator armature including a single armature of a different form and a different cogging generating element.

A 1-phase energized coreless disk-type axial-flow brushless fan motor which contains a single armature coil of a modified specific configuration therein will now be described with reference to FIGS. 29 to 31. FIG. 29 is a plan view of an armature coil 680 constituting a stator armature 645 which is suitable for use with such an 8-pole magnet rotor 452 as shown in FIG. 24.

The armature coil 680 is in the form of a readily formable rectangular frame so that a turning torque which can be generated substantially by two conventional armature coils such as the armature coils 444-1, 444-2 described above may be generated by a single armature coil similarly as the armature coil 579 described above. As the armature coil 680 is formed as a rectangular frame in this manner, magnetically active conductor portions 680A, 680B thereof which contribute to generation of a torque extend askew relative to radial directions as seen in FIG. 29, and as a result, energization of the armature coil 680 can be effected smoothly, resulting in smooth rotation of the magnet rotor. Accordingly, turning noises of the motor will be very low.

Conventionally, where an 8-pole magnet rotor is used, two armature coils each formed as a sector-shaped frame and having a pair of magnetically active conductor portions which contribute to generation of a torque and include a width of 45 degrees, such as the armature coils 444-1, 444-2 shown in FIG. 25, are located at symmetrical positions spaced by an angle of 180 degrees from each other. To the contrary, the armature coil 680 is very simple in shape as apparently seen in FIG. 29 and hence can be readily mass-produced at a very low cost.

Figure 30:
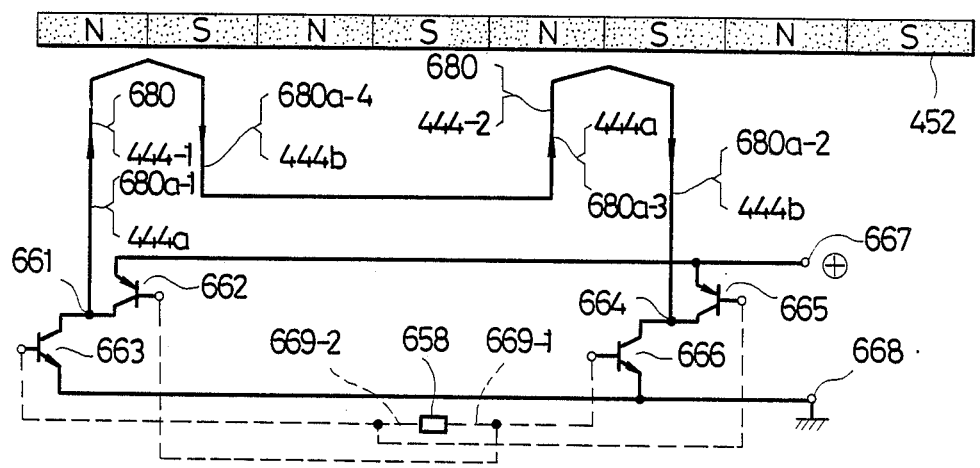
FIG. 30 is a developed view of the stator armature of FIG. 29 and the magnet rotor of FIG. 24.

It can be apparently seen from a developed view of FIG. 30 that the armature coil 680 is as effective as the armature coil 579 shown in FIGS. 27 and 28. In particular, the magnetically active conductor portion 680A of the armature coil 680 corresponds to the magnetically active conductor portion 444a of the armature coil 444-1 and the magnetically active conductor portion 444b of the armature coil 444-2 while the other magnetically active conductor portion 680B corresponds to the magnetically active conductor portion 444b of the armature coil 444-1 and the magnetically active conductor portion 444a of the armature coil 444-2. More particularly, the conductor portion 680a-1 of the conductor portion 680A corresponds to the magnetically active conductor portion 444a of the armature coil 444-1, the conductor portion 680a-4 of the conductor portion 680B to the magnetically active conductor portion 444b of the armature coil 444-1, the conductor portion 680a-2 of the conductor portion 680A to the magnetically active conductor portion 444b of the armature coil 444-2, and the conductor portion 680a-3 of the conductor portion 680B to the magnetically active conductor portion 444a of the armature coil 444-2.

Now, referring to a developed view of FIG. 30, when the magnetically active conductor portion 680a-1 of the armature coil 680 and the magnetically active conductor portion 444a of the armature coil 444-1 are opposed to an N pole of the magnet rotor 452, the magnetically active conductor portion 680a-3 of the armature coil 680 and the magnetically active conductor portion 444a of the armature coil 444-2 which are located at symmetrical positions spaced by an angle of 180 degrees from the conductor portion 680a-1 and the conductor portion 444a of the armature coil 444-1, respectively, are also opposed to another N pole of the magnet rotor 452. Accordingly, if electric current flows in the same direction through those conductor portions, a turning torque in a predetermined direction can be generated. Accordingly, the armature coil 680 having a configuration as seen in FIGS. 29 and 31 will not cause such a disadvantage as will be caused where a 6-pole magnet is used.

Figure 31:
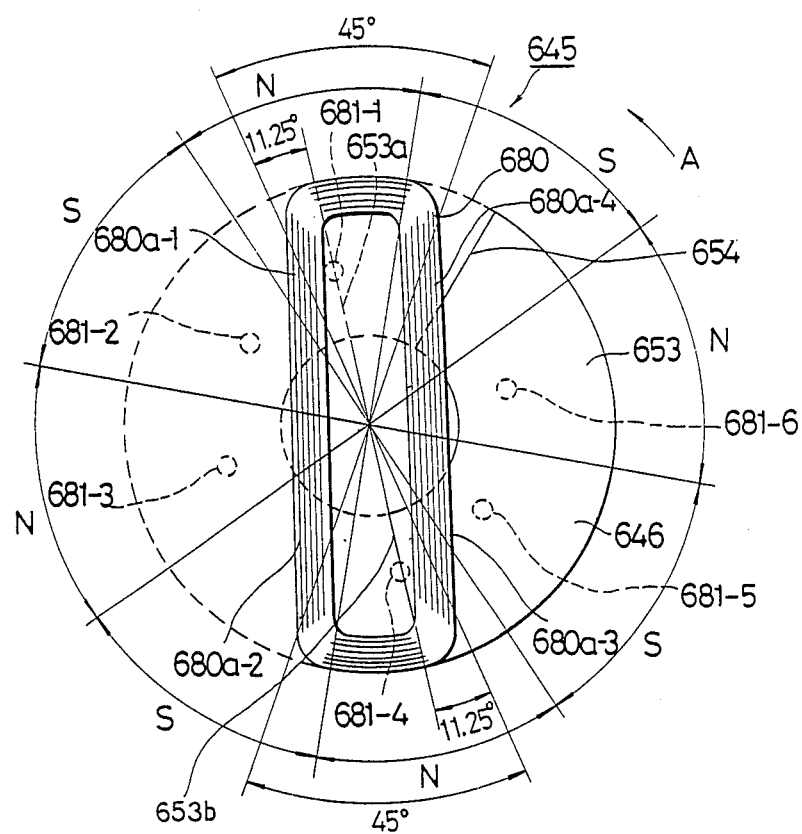
FIG. 31 is a similar view, in an enlarged scale, of the arrangement of FIG. 29.

FIG. 31 is an enlarged view of the arrangement of FIG. 29. Six circles 681-1, 681-2, 681-3, 681-4, 681-5, 681-6 shown in broken lines in FIG. 31 indicate positions to which an end 653a of a cutaway portion 654 of a cogging generating stator yoke 653 can be brought in order to generate a cogging torque. It is to be noted that while in the case of the arrangement of FIG. 31 there are two other positions suitable for generation of a cogging torque, they are omitted for convenience of illustration. The condition on which the end 653a of the cutaway portion 654 of the stator yoke 653 is located is the same as described hereinabove, and the position suitable for location of the end 653a of the stator yoke 653 is a position corresponding to any of the circles 681-1 to 681-6 shown in broken lines in FIG. 31. In the arrangement shown, a position corresponding to the broken line circle 681-1 is selected for the position.

Here, in accordance with the end described above, the end of the cutaway portion 654 may be further cut away from the position 653a shown in a broken line to form an end 653b at a symmetrical position spaced by an angle of 180 degrees from the end 653a. In this case, the end 653b may be provided by forming the cutaway portion 654 with such an increased width.

Figure 32:
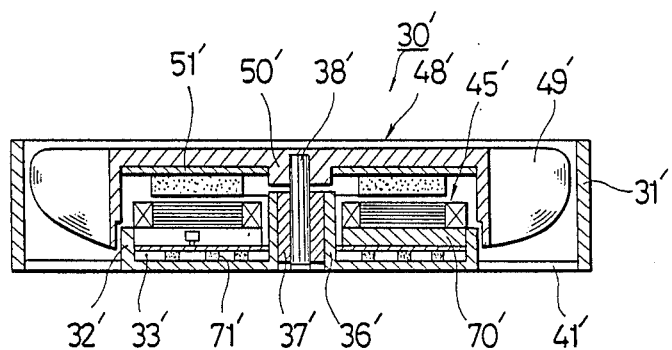
FIG. 32 is a vertical sectional view of a disk-type axial-flow brushless fan motor according to a second embodiment of the invention.
Figure 33:
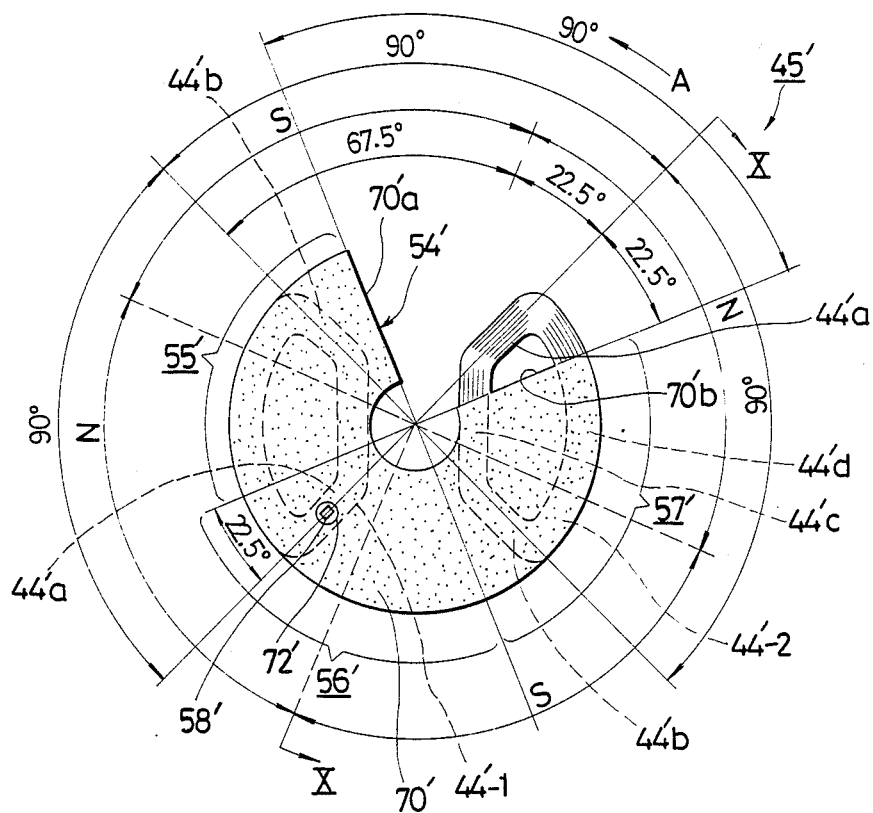
FIG. 33 is a bottom plan view of a stator armature including two armature coils and a cogging generating magnetic circuit board where a 4-pole field magnet is employed in the motor of FIG. 32.
Figure 34:
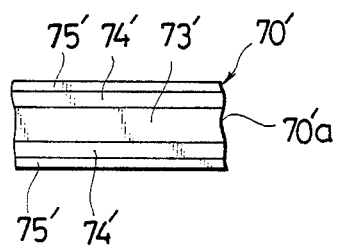
FIG. 34 is an enlarged vertical sectional view of the cogging generating magnetic circuit board of FIG. 33.

Referring now to FIGS. 32 to 34, there is illustrated a disk-type axial-flow brushless fan motor to which a 1-phase disk-type brushless motor according to an additional embodiment of the invention is applied. Referring first to FIG. 32, the motor shown is constructed as a 1-phase disk-type axial-flow brushless fan motor having a single position-detecting element, two coils and a magnet rotor having four poles and is similar in most parts to the motor shown in FIG. 11. Description of such common construction will be omitted herein to eliminate repetition.

The principal difference is that the motor of FIG. 32 does not include a specific cogging generating stator yoke such as the stator yoke 53 of the motor of FIG. 11 but includes a magnetic circuit board 70' which serves as the stator yoke 53 and also as the printed circuit board 46 of the motor of FIG. 11. The magnetic circuit board 70' is securely mounted on the bottom of a cup-shaped motor casing 32' (the posts 34 of the motor of FIG. 11 are omitted here), and chip parts 71' constituting an energization controlling circuit are mounted on a lower face of the magnetic circuit board 70'.

Referring to FIG. 34, the magnetic circuit board 70' includes a magnetic plate 73' and a pair of insulator layers 74' formed on opposite faces of the magnetic plate 73' by applying an insulating material or paint. A printed wiring pattern 75' is formed on an outer face of each of the insulator layers 74' by suitable means such as etching. Such a magnetic circuit board is generally called an iron circuit board because the magnetic plate is in most cases made of an iron plate.

Referring to FIG. 33, the magnetic circuit board 70' has a cutaway portion 54' having a width substantially equal to the width of each pole of the 4-pole magnet rotor, that is, an angle of 90 degrees, and a pair of armature coils 44'-1, 44'-2 forming a stator armature 45' are located at symmetrical positions spaced by an angle of 180 degrees from each other on the magnetic circuit board 70' as seen in FIG. 33 such that an end 70'a of the cutaway portion 54' of the magnetic circuit board 70' is spaced by an angle substantially equal to one fourth of the width of each pole of the magnet rotor, that is, 22.5 degrees, rearwardly from a magnetically active conductor portion 44'b of the armature coil 44'-1 in the direction of rotation of the rotor (in the direction of arrow mark A) in accordance with the principle appearing hereinabove. The end 70'a of the magnetic circuit board 70' may naturally be further cut away in a similar manner as in the stator yoke 53 of FIG. 14 or may be tapered as in the stator yoke 53 of FIG. 17.

The magnetic circuit board 70' further has a perforation 72' formed at a position just below the other magnetically active conductor portion 44'a of the armature coil 44'-1, and a position detecting element 58' is accommodated in the perforation with its terminals soldered to the printed circuit pattern on the magnetic circuit board 70'. This position of the perforation 72' will not have any effect on generation of a cogging torque. The perforation 72' may be formed simultaneously when the cutaway portion 54' is formed, for example, by stamping.

It will be appreciated that the magnetic circuit board 70' serving as a printed circuit board and also as a cogging generating stator yoke can apparently assume any of the configurations which can be assumed by the cogging generating stator yokes described hereinabove.

Also, it will be appreciated that while in all of the embodiments and modifications shown in the drawing and described hereinabove a cogging generating stator yoke having a cutaway portion is located such that an end thereof adjacent the cutaway portion is spaced by an angular distance equal to about one fourth of the width of each pole of a field magnet or magnet rotor rearwardly from a magnetically active conductor portion of an armature coil in the direction of rotation of the rotor because this position is ideal, substantially equivalent effects may be attained if it is located such that the end thereof may be positioned within a range from a position at which a maximum starting torque can be obtained or any other corresponding same phase position to a position spaced rearwardly therefrom by a distance equal to about one half of the angular width of each pole of the magnet rotor in the direction of rotation of the magnet rotor.

What is claimed is:

1. A 1-phase energized brushless motor, comprising: a magnet rotor mounted for rotation and having 2P north and south poles, P being an integer equal to or greater than 1; at least one coreless armature coil disposed at a stationary same-phase position in an opposing relationship to said magnet rotor with an air gap left therebetween; a stator yoke for mounting said armature coil thereon; a single position-detecting element for determining in which direction electric current flows through said armature coil; and an electric circuit for detecting a pole of said magnet rotor to selectively energize said armature coil; said stator yoke having formed therein at least one cutaway portion defined by an arc of the stator yoke and two ends, each of which extends in a radial direction of the stator yoke or a direction oblique to the radial direction, and between said ends, having an angular width θ determined substantially by the following expression:

$$T \leq m \cdot T \leq \theta < 2n \cdot T$$

where T is the angular width of each pole of said magnet rotor, m is an integer ranging from 1 to 2n; and n is an integer of at least 1 with 2n being equal to or smaller than the total number 2P of the poles of said magnet rotor; said stator yoke being located such that at least one of said ends of said cutaway portion thereof is positioned within a range from a position at which a maximum starting torque can be obtained or any other same-phase position to a position spaced backwardly therefrom by a distance equal to about one half of the angular width of each pole of said magnet rotor in the direction of rotation of said magnet rotor.

2. A 1-phase energized brushless motor according to claim 1, wherein the angular width between said ends of said cutaway portion of said stator yoke is substantially equal to the angular width of each pole of said magnet rotor, each of said ends extending in a radial direction of the stator yoke.

3. A 1-phase energized brushless motor according to claim 1, wherein said stator yoke has a plurality of cutaway portions formed in an equidistantly spaced relationship therein, each of said cutaway portions having an angular width substantially equal to the angular width of each pole of said magnet rotor.

4. A 1-phase energized brushless motor according to claim 3, wherein said stator yoke has a pair of cutaway portions formed therein at symmetrical positions spaced by an angle of 180 degrees from each other.

5. A 1-phase energized brushless motor according to claim 1, wherein said stator yoke is located such that at least one of said ends of said cutaway portion thereof, which extends in a radial direction of the stator yoke, is positioned within a range from a position at which a maximum starting torque can be obtained or any other same-phase position to a position spaced backwardly therefrom by a distance equal to about one third of the angular width of each pole of said magnet rotor in the direction of rotation of said magnet rotor.

6. A 1-phase energized brushless motor according to claim 1, wherein said stator yoke is located such that one of said ends of said cutaway portion thereof, which extends in a radial direction of the stator yoke, is positioned within a range from a position at which a maximum starting torque can be obtained or any other same-phase position to a position spaced backwardly therefrom by a distance equal to about one fourth of the angular width of each pole of said magnet rotor in the direction of rotation of said magnet rotor.

7. A 1-phase energized brushless motor according to claim 1, wherein said stator yoke has a plurality of cutaway portions formed in an equidistantly spaced relationship therein; each of said cutaway portions is defined by an arc of the stator yoke and two ends extending in radial directions, and between said ends, having the angular width substantially equal to the angular width of each pole of said magnet rotor; and at least one of said ends is positioned within a range from a position at which a maximum starting torque can be obtained or any other same-phase postion to a position spaced backwardly therefrom by a distance equal to about one half of the angular width of each pole of said magnet rotor in the direction of rotation of said magnet rotor.

8. A 1-phase energized brushless motor according to claim 1, wherein said stator yoke is a magnetic circuit board including a magnetic plate having an insulator layer formed on a face thereof, said insulator layer having formed thereon a printed wiring pattern made of a conductive material.

9. A 1-phase energized brushless motor according to claim 1, which comprises a plurality of armature coils located at same-phase positions so that they may not overlap each other.

10. A 1-phase energized brushless motor according to claim 1, wherein said at least one coreless armature coil has magnetically active conductor portions which contribute to generation of a torque and include an angular width substantially equal to an angular width obtained by multiplying the angular width T of each pole of said magnet rotor by an odd number.

11. A 1-phase energized brushless motor according to claim 1, which is a coreless disk-type brushless motor.

12. A 1-phase energized brushless motor according to claim 1, wherein said magnet rotor has 4P alternate north and south poles, and said motor comprises a single coreless armature coil in a frame-like configuration disposed at a stationary position in an opposing relationship to said magnet rotor with an axial air gap left therebetween and having magnetically active conductor portions which contribute to generation of a torque and include an angular width substantially equal to the angular width of each pole of said magnet rotor, said magnetically active conductor portions of said armature coil extending in such a way that one of them opposes a N pole and a S pole and another one of them opposes another N pole, which is located at a position antipodal to the first-mentioned N pole, and another S pole, which is located at a position antipodal to the first-mentioned S pole.

13. A 1-phase energized brushless motor according to claim 1, wherein said stator yoke has parts of an electric circuit located on at least one of opposite faces thereof.

14. A 1-phase energized brushless motor according to claim 1, wherein said stator yoke has located on at least one of opposite faces thereof a printed circuit board for locating thereon parts of an electric circuit.

15. A 1-phase energized brushless motor according to claim 1, wherein said position-detecting element is located in a opposing relationship to said cutaway portion of said stator yoke and at a substantially same-phase position as one magnetically active conductor portion of said at least one armature coil which contributes to generation of a torque.

16. A 1-phase energized brushless motor according to claim 1, which is located within a motor case of a disk-type axial-flow brushless fan motor.

17. A 1-phase energized brushless motor according to claim 1, wherein said stator yoke has formed therein at least one cutaway portion having an angular width θ determined by said expression said stator yoke having at least one radial projection which extends from an outer periphery of an annular magnetic plate of a small diameter and defines said at least one cutaway portion therebetween, said projection of said stator yoke being positioned either within a range from a position at which a maximum torque can be obtained to a position spaced backwardly by an distance equal to about one half of each pole of said magnet rotor or at a same-phase position.

18. A 1-phase energized brushless motor according to claim 1, wherein one of the ends of the cutaway portion extends in a direction oblique to a radial direction of the stator yoke.

19. A 1-phase energized brushless motor according to claim 18, wherein the angular width $\theta$ is greater than m.T.

20. A 1-phase energized brushless motor according to claim 18, wherein the cutaway portion has a part on the side of said one end, the radial dimension of which decreases gradually toward said one end in the circumferential direction of the stator yoke.

21. A 1-phase energized brushless motor according to claim 18, wherein the cutaway portion has a part on the side of said one end, the radial dimension of which decreases gradually toward said one end in the circumferential direction of the stator yoke within a range equal to one half of the angular width of each pole of the magnet rotor.

22. A 1-phase energized brushless motor according to claim 20, wherein said circumferential direction of the stator yoke is the same as the direction of rotation of the magnet rotor.

23. A 1-phase energized brushless motor according to claim 1, wherein said ends of the cutaway portion extend in radial directions of the stator yoke; and the thickness of the stator yoke decreases gradually in a desired direction at an end portion thereof which is adjacent to one of the ends of the cutaway portion.

24. A 1-phase energized brushless motor according to claim 23, wherein the thickness of the stator yoke decreases gradually in a desired direction within a range equal to about one half of the angular width of each pole of the magnet rotor.

* * * * *